(12) United States Patent
Boldyrev et al.

(10) Patent No.: US 8,661,500 B2
(45) Date of Patent: Feb. 25, 2014

(54) METHOD AND APPARATUS FOR PROVIDING END-TO-END PRIVACY FOR DISTRIBUTED COMPUTATIONS

(75) Inventors: Sergey Boldyrev, Söderkulla (FI); Jari-Jukka Harald Kaaja, Jävenpää (FI); Hannu Ensio Laine, Espoo (FI); Jukka Honkola, Espoo (FI); Vesa-Veikko Luukkala, Espoo (FI); Ian Justin Oliver, Söderkulla (FI)

(73) Assignee: Nokia Corporation, Espoo (FI)

( * ) Notice: Subject to any disclaimer, the term of this patent is extended or adjusted under 35 U.S.C. 154(b) by 161 days.

(21) Appl. No.: 13/112,126

(22) Filed: May 20, 2011

(65) Prior Publication Data

US 2012/0297441 A1    Nov. 22, 2012

(51) Int. Cl.
*H04L 29/06* (2006.01)

(52) U.S. Cl.
USPC ................ 726/1; 726/2; 726/3; 726/4; 726/5; 726/6; 713/151; 713/152; 713/153

(58) Field of Classification Search
USPC ............................................................. 726/1
See application file for complete search history.

(56) References Cited

U.S. PATENT DOCUMENTS

| | | | |
|---|---|---|---|
| 6,981,029 B1 | 12/2005 | Menditto et al. | |
| 7,069,259 B2 | 6/2006 | Horvitz et al. | |
| 7,748,027 B2 * | 6/2010 | Patrick | 726/2 |
| 7,831,995 B2 | 11/2010 | Futoransky et al. | |
| 2006/0031506 A1 | 2/2006 | Redgate | |
| 2006/0167858 A1 | 7/2006 | Dennis et al. | |
| 2007/0056026 A1 * | 3/2007 | Britton et al. | 726/5 |
| 2009/0099860 A1 * | 4/2009 | Karabulut et al. | 705/1 |
| 2009/0106815 A1 | 4/2009 | Brodie et al. | |
| 2009/0271355 A1 | 10/2009 | Sekiguchi | |
| 2010/0017870 A1 | 1/2010 | Kargupta | |
| 2010/0235514 A1 | 9/2010 | Beachem | |
| 2010/0242120 A1 | 9/2010 | Anderson et al. | |

FOREIGN PATENT DOCUMENTS

| | | |
|---|---|---|
| JP | 2004-287912 A | 10/2004 |
| WO | WO 2008/085809 A2 | 7/2008 |

OTHER PUBLICATIONS

International Search Report for PCT/FI2012/050428 dated Jul. 26, 2012, pp. 1-7.
Written Opinion for PCT/FI2012/050428 dated Jul. 26, 2012, pp. 1-10.
Belkhouche et al., "A RISC Virtual Machine for Internet Programming," UAE University, Jan. 31, 2011, pp. 1-40.
Fink, "User Modeling Servers—Requirements, Design, and Evaluation," Universitat Duisburg-Essen, Jul. 15, 2003, pp. 1-205.

* cited by examiner

*Primary Examiner* — Longbit Chai
(74) *Attorney, Agent, or Firm* — Ditthavong Mori & Steiner, P.C.

(57) ABSTRACT

An approach is provided for providing end-to-end privacy in multi-level distributed computations. A distributed computation privacy platform determines one or more privacy policies associated with at least one level of a computational environment. The distributed computation privacy platform also determines one or more computation closures associated with the at least one level of the computational environment. The distributed computation privacy platform further processes and/or facilitates a processing of the one or more privacy policies and the one or more computation closures to cause, at least in part, an enforcement of the one or more privacy policies.

18 Claims, 15 Drawing Sheets

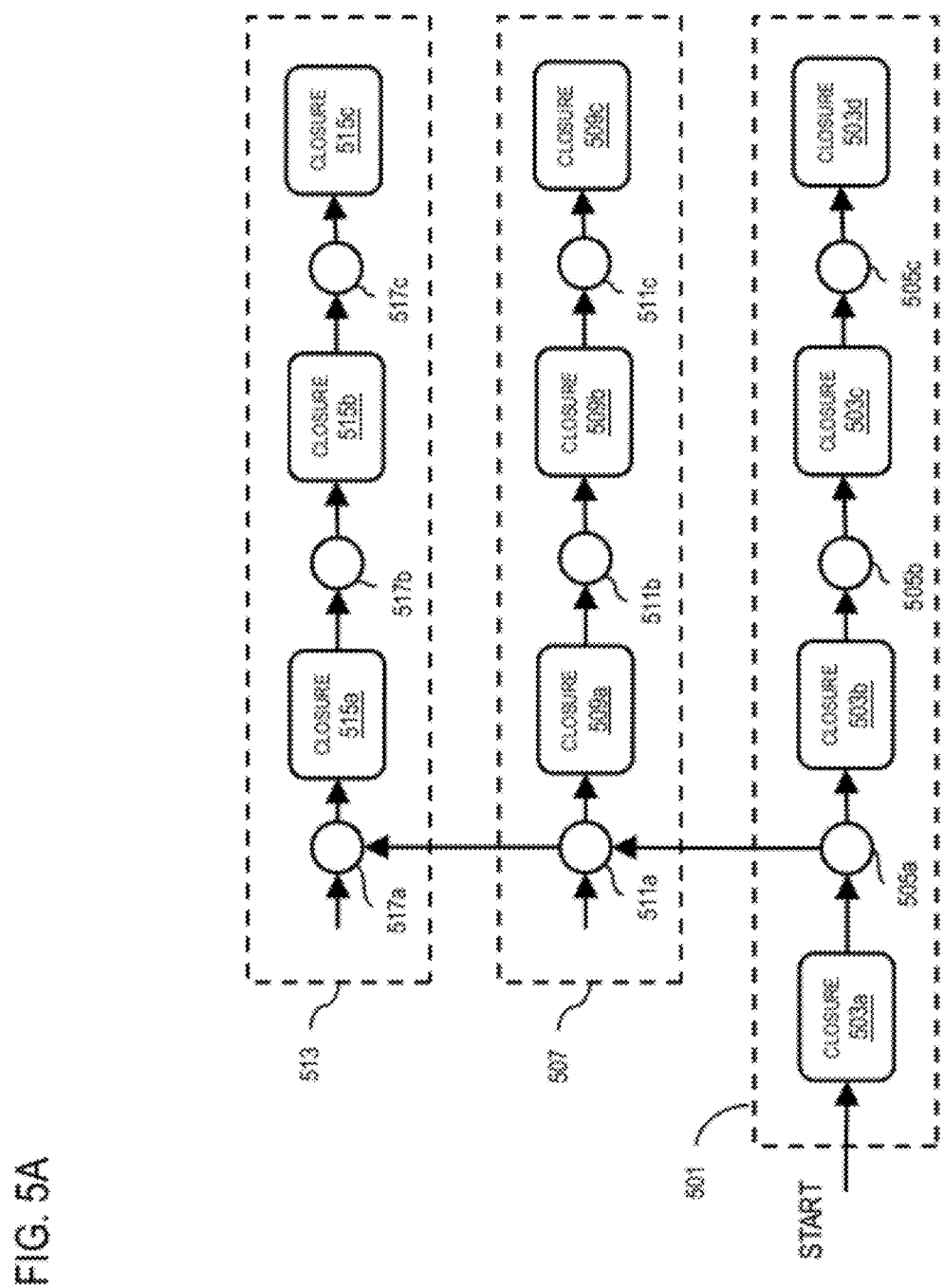

METHOD AND APPARATUS FOR PROVIDING END-TO-END PRIVACY FOR DISTRIBUTED COMPUTATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). On the other hand, different levels of proactive, reactive or a mixture of computational elements may be available to the device in various other components of various architectural levels (e.g. device level, infrastructure level, etc.), wherein different distributed components may have different capabilities and support different processes. In various example circumstances, to enhance the information processing power of a device and reduce the processing cost, one might consider minimizing or at least significantly improving exchange of data, information and computations among the distributed components within a computational environment by providing multi-level distributed computations, such that the data can be migrated to the closest possible computation level with minimized or improved cost.

However, despite the fact that information and computation presented by the respective levels of computation environment can be distributed with different granularity, still there are challenges in certain example implementations to achieve scalable high context information processing within such heterogeneous environments. For example, in various implementations, due to distributed nature of the environment, (e.g., devices, infrastructures, and clouds), data, information, and computation elements (e.g., computation closures) are being exchanged among distributed devices within heterogeneous network environments wherein information with various levels of granularity and various structures is provided by and transmitted among various independent sources (e.g. owners). In such environments, achieving the end-to-end privacy of exchanged information and computation closures, development time and runtime authentication and contextual validation is an important issue.

Some Example Embodiments

Therefore, there is a need for an approach for providing end-to-end privacy in multi-level distributed computations.

According to one embodiment, a method comprises determining one or more privacy policies associated with at least one level of a computational environment. The method also comprises determining one or more computation closures associated with the at least one level of the computational environment. The method further comprises processing and/or facilitating a processing of the one or more privacy policies and the one or more computation closures to determine whether to cause, at least in part, an enforcement of the one or more privacy policies.

According to another embodiment, an apparatus comprises at least one processor, and at least one memory including computer program code, the at least one memory and the computer program code configured to, with the at least one processor, cause, at least in part, the apparatus to determine one or more privacy policies associated with at least one level of a computational environment. The apparatus is also caused to determine one or more computation closures associated with the at least one level of the computational environment. The apparatus is further caused to process and/or facilitate a processing of the one or more privacy policies and the one or more computation closures to determine whether to cause, at least in part, an enforcement of the one or more privacy policies.

According to another embodiment, a computer-readable storage medium carries one or more sequences of one or more instructions which, when executed by one or more processors, cause, at least in part, an apparatus to determine one or more privacy policies associated with at least one level of a computational environment. The apparatus is also caused to determine one or more computation closures associated with the at least one level of the computational environment. The apparatus is further caused to process and/or facilitate a processing of the one or more privacy policies and the one or more computation closures to determine whether to cause, at least in part, an enforcement of the one or more privacy policies.

According to another embodiment, an apparatus comprises means for determining one or more privacy policies associated with at least one level of a computational environment. The apparatus also comprises means for determining one or more computation closures associated with the at least one level of the computational environment. The apparatus further comprises means for processing and/or facilitating a processing of the one or more privacy policies and the one or more computation closures to determine whether to cause, at least in part, an enforcement of the one or more privacy policies.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5B are diagrams of distribution of privacy enforced computations in multi-level computational environment, according to one embodiment;

DESCRIPTION OF SOME EMBODIMENTS

Examples of a method, apparatus, and computer program for providing end-to-end privacy in multi-level distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
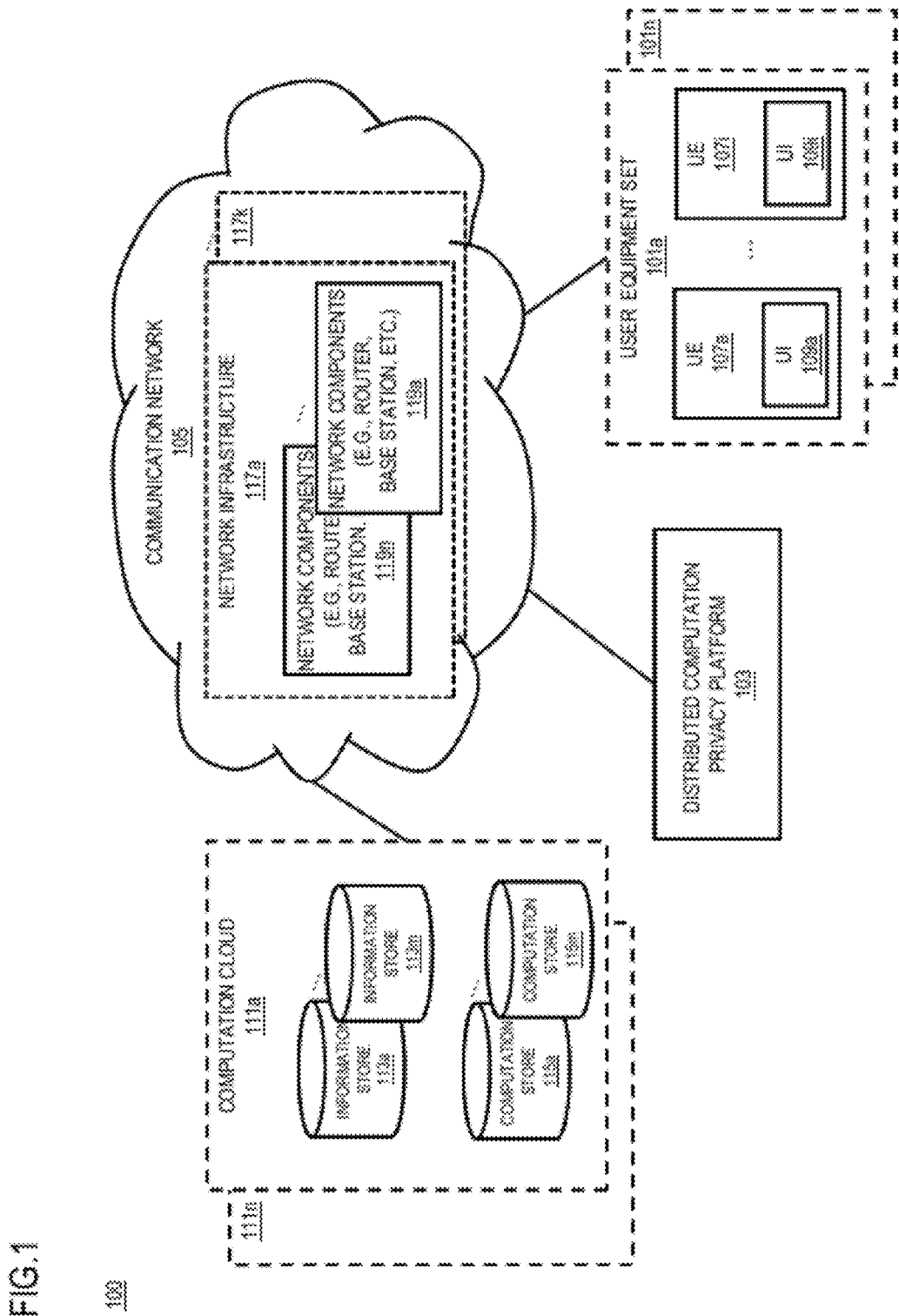
FIG. 1 is a diagram of a system capable of providing end-to-end privacy in multi-level distributed computations, according to one embodiment.

FIG. 1 is a diagram of a system capable of providing end-to-end privacy in multi-level distributed computations, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for energy saving, without having to access the cloud level, if energy cost is lower at infrastructure level. A device may also be able to utilize, at least in part, the resources from other devices in the device level of the architecture without having to reach to the infrastructure level or the cloud. Alternatively, a device may have direct computational closure connectors to cloud level, where devices are more tightly linked to cloud environment for energy saving purposes.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Alternatively, a user, a manufacturer, a system administrator, etc. may set up the elements of a computational architecture or environment in a way that computation transfer among various elements and/or levels of the environment is automatically activated based on predefined and periodically measured factors. In this case, all or parts of computation transfer may run in the background either throughout the end-to-end distribution path from device level to cloud level, or only in some levels (e.g. device level). The computation distributions that take place in the background may be hidden from the device users. Alternatively, the users may receive messages indicating that distribution is running on the background. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture or environment consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Therefore, execution of computation closures associated with a process related to a device at the infrastructure level can provide services to device users in a more efficient manner. However, components of a multi-level architectural environment composed of device level, infrastructure level and cloud level each may differ in configuration, communication capability, policies applied in terms of ownership, privacy and security of distributed computations, etc.

In one embodiment, the closures may be signed with signatures that are generated by means of isomorphic transformations thus represent domain independent fragments that could be interpreted in some cases as at least meaningful information sets. Furthermore, distribution, access and execution of computation closures among components and levels of a multi-level architectural environment may require compatibility among privacy policies and rules imposed by various components and levels of environment.

In one embodiment, a multi-level computation environment includes policies for privacy execution and validation in device, infrastructure and cloud levels of the computational environment. The policies may consist of privacy policy enforcement, privacy execution domain at device, infrastructure, and cloud levels, wherein each domain may provide its own privacy policy. It is noted that privacy policy for signed flows of computational closure (e.g. functional flows) at device, infrastructure, and cloud levels may have overlapping capabilities which affect overall results. For example, some devices may have power limitations and this limitation may be reflected in the privacy policy rules and information sharing for that device.

In one embodiment, privacy policies provide different degrees of what and how various rule enforcements are applied on information and computations. Additionally, privacy policies may be based on probabilistic logic, first order logic, logics of higher orders, etc. For example, in a probabilistic policy computations and their associated closures may affect privacy or for a policy based on first order logic there may exist direct links to the closures where privacy rules can be applied.

In one embodiment, a computation closure privacy policy may consist of policy rules, and mechanisms for applying the rules accordingly. The policy application mechanisms may be grouped into three main categories as encryption, filtering, and anonymization. Furthermore, the computational closures are used based on privacy policy enforcement and signing of closure mechanisms. The total solution creates a balance between security, privacy and energy limitation settings and threshold to each multi-level computation environment setting consisting of device level, infrastructure level and cloud level.

In various embodiments, any fault in privacy rules, policies or mechanisms may lead to malfunctioning of one or more privacy policies. In such situations, the decomposition of privacy policies may not be manageable or resolvable.

In one embodiment, different components of each architectural level support different types of closures with different levels and/or types of privacy defined, enforced, or a combination thereof. Each component (e.g. infrastructure component, node) may have a number of previously created privacy enforced entities, closures, links, and distribution paths for the distribution and execution of the computation closures such as connectors between closures, multiple branches, interaction points, rules, etc., that can significantly affect the efficiency of distribution and execution of computations and end-to-end privacy of the computations in multi-level environments.

In one embodiment, the computations can be transferred and/or expanded from one component to another or from an architectural level to another (e.g. from infrastructure to cloud). Components and levels of multi-level computation environment may be equipped with privacy policies in order to verify privacy policies enforced by other components to ensure computation privacy. For example, computations signed as highly private may be regarded as inaccessible. However, various privacy policies may be based on different rules, verification methods, encoding and decoding mechanisms, etc.

In another embodiment, complex or compound computational closures (also referred to as superclosures) that may represent various computations and are formed based on combination of one or more primitive computation closures, may be associated with complex or compound privacy policies formed based on combination of one or more policies of their primitive computation closures (also referred to as root elements). In this embodiment, for example, failure or malfunctioning of a superclosure may be caused by the failure or malfunctioning of its compound privacy policy which in turn may be caused by failure or malfunctioning of one or more of its root element policies. In order to find the defected root elements the compound policy may have to be decomposed. However, current multi-level environments do not have privacy rules or policies that can hide the computational closure flow ownership. There are no mechanisms for decomposing the right privacy policy rule applied to certain functional flow and there are no mechanisms for computational closure privacy policies to enforce the method of the encryption.

Therefore, there is a challenge to achieve computation privacy within a heterogeneous environment of multi-level environments, wherein computations with various levels of granularity and various structures are provided, signed and transmitted among various independent sources.

To address this problem, a system 100 of FIG. 1 introduces the capability to provide end-to-end privacy in multi-level distributed computations. A computational environment consists of different levels of proactive computational elements available for various levels of the computational environment such as device level, infrastructure level, and cloud computing level. Since these computational elements provide various levels of functionality for each of the levels of the environment, providing different levels of distribution of the computational closures within the computational environment enables the execution of the computational closures after the least required level of distribution. However, a very important functionality for execution of computational closures is to detect, identify, and determine computation privacy and to ensure privacy of computational closures, by creating compatibility among various types and levels of existing privacy measures at each part of the multi-level computational environment.

In one embodiment, a cloud may include a superset of closure elements (e.g. closure primitives) and a superset (also referred to as a lattice) of privacy policy root elements while the infrastructure or device level components may have subsets of, and therefore the cloud may be capable of supporting computational closures and their privacy more effectively compared to the infrastructure or device levels.

In one embodiment, device setup at various architectural levels such as privacy settings, security settings, quality of service (QOS) settings, class of service (COS) settings, priority settings etc., may affect direction and method of computational closure distribution, as different setups may lead to different situations and different available distribution paths and requirements. Additionally, computation closures' privacy can be affected by other features of architectural levels such as security enforcement strategies, etc. On the other hand, ensuring privacy enforced distribution between different architectural levels and components can be achieved by different levels of computation distribution.

In one embodiment, certain amount of computation functionality can be transferred from device level to infrastructure level or further to cloud level depending on the available capabilities and requirements at each level. For example, for computations associated with a public device that is used commonly by multiple users, a strict privacy enforcement measure may not be necessary, while private and confidential computations may require more advanced measures (e.g. policy enforcements).

In another embodiment, when an infrastructure node has a limited privacy support capability, the computations may be transferred to a next nearest node with higher privacy capabilities where computation can continue, and redistributed to the cloud level if there is no infrastructure node with sufficient privacy support capability. It is noted that various factors such as different device setups, limitations, configurations, any changes that occur in the setups, limitations and configurations during the runtime, etc. may change the direction of computation closure distribution, as privacy support capabilities may change in accordance with the changing factors. Additionally, a threshold value for the lowest acceptable level of privacy can be associated with the computations. In such case, if neither of the levels of the environment has sufficient capability for the execution of the computations, one or more functions can be activated to for example, terminate the computation, issue a request for higher privacy capabilities, issue an error message to the owner of the computation, replace the computation with similar computations with lower privacy requirement, etc.

In one embodiment, operations can be performed to determine and compare privacy of computation closure processes between devices and infrastructures and between infrastructures and clouds. It can also be determined where it is more cost effective to transfer computation closures to, what the acceptable range of privacy for one or a group of computation closures is (taking into account other capabilities relevant for the computation such as security levels and rules, energy issues like battery vs. main power plug connection, etc). Furthermore, each policy can be associated with a privacy level so that proper policies can be assigned to computations based on their privacy requirements.

In one embodiment, in a multi-level computation environment associated with a specific privacy mechanism, functional flows or groups of distributed computational closures may be signed by unique compound policies composed of the policies of their constituting closure primitives and the compound policies are connected to the privacy mechanism.

As shown in FIG. 1, the system 100 comprises sets 101a-101n of user equipments (UEs) 107a-107i having connectivity to a distributed computation privacy platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107a-107i can support any type of interface to the user (such as "wearable" circuitry, etc.).

In one embodiment, the UEs 107a-107i are respectively equipped with one or more user interfaces (UI) 109a-109i.

Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

In one embodiment, process distribution can be initiated for example by means of unicast (e.g., to just another device) or multicast (e.g., to multiple other devices). For example one UE 107a may communicate with many infrastructures (or many components of many infrastructures), while many nodes of infrastructures may communicate with multiple clouds. Additionally, process distribution may be triggered via gesture recognition, wherein the user preselects a particular set of UI elements and makes a gesture to simulate "pouring" the selected UE elements from one device to another. In other embodiments, process distribution may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation spaces 115a-115m include multiple sets of one or more computation closures. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the communication network 105 consists of one or more infrastructures 117a-117k wherein each infrastructure is a designed communication system including multiple components 119a-119n. The components 119a-119n include backbones, routers, switches, wireless access points, access methods, protocols, etc. used for communication within the communication network 105 or between communication network 105 and other networks.

In one embodiment, the distributed computation privacy platform 103 controls the distribution of computations associated with UEs 107a-107i to other components or levels of the computational environment including the infrastructure level 117a-117k within the environment of the communication network 105, and the cloud level 111a-111n, based on privacy policies and privacy enforcement associated with different architectural levels and privacy requirements of computations.

In one embodiment, privacy verification of computation distribution may be initiated by the user, or based on a background activity for example by triggering a sequence of computation closures which in turn support distribution process. Prior to computation distribution the capabilities, including the privacy capabilities of components performing the computations, are evaluated. If capabilities of an architectural level are not satisfactory or changes in capabilities are found, the evaluation process will continue until proper capabilities become available. The privacy capabilities may be found in the same or other levels of the computational environment and the computation closure execution will be performed at the level where available capabilities are found.

In another embodiment, network components $119a$-$119n$ may provide different levels of functionality. For example, some components $119a$-$119n$ may provide static computational closures while others may provide dynamic computational closures. As used herein, static computational closures are closures with predetermined configurations, which in return may require a predefined level of privacy for execution, while dynamic computational closures are closures that may function differently based on dynamic factors such as time, traffic load, type or amount of available privacy, etc. In one embodiment, a dynamic computation closure may adjust itself based on the dynamic factors by modifying parameters such as the level of available privacy. For example, a dynamic computation closure may downgrade itself in order to be handled with a lower level of privacy. In other embodiments, critical computation closures may be assigned lower and upper acceptable privacy thresholds wherein available privacy within that range is acceptable.

In one embodiment the level and type of available privacy at a component of the infrastructure $117a$-$117k$ may or may not be aligned with the required privacy by computation closures of UE $107a$-$107i$ through a one to one mapping. This means that the component may need to locate (or request) other components with higher levels of privacy capabilities from current or next layer or level of the computational environment and forward the computations to located components. The component may also have the capability to adjust its privacy settings and adapt its privacy capability to the computation requirements. In other words, if the privacy availability between a process and its processing environment is not directly aligned, the processing environment may expand its capabilities (for dynamic closures) or locate other components (for static closures) or a combination thereof. In one embodiment, if neither the direct alignment succeeds nor alternate environment is found, the setup may be aligned with lower privacy requirements. The requirements may be lowered, for example by dropping part of the computational closures, substituting complex computations with more primitive computations that may produce less accurate, but accurate enough for user's needs, results. Additionally, the satisfaction threshold may be lowered (with service provider and user's agreement) so that a lower level of computation privacy can be considered as satisfactory.

In one embodiment, a user of UEs $107a$-$107i$ may select certain dynamic computation flows to be used as default computation flow under certain conditions, for example in determined times, for specifically determined computation privacy levels, etc. In this embodiment, the distributed computation privacy platform 103 may associate specific levels of priority to the selected computation flows such that, if available, the selected computation flows have priority over other available computations. The selected computation flows and the assigned priorities can determine levels of satisfaction threshold for the user of UEs $107a$-$107i$.

In one embodiment, the computational closures available in multiple levels of device level $101a$-$101n$, infrastructure level $117a$-$117k$, and cloud level $111a$-$111n$ and their associated policies are either aligned, meaning that all the computational closures and policies are available in every level, or a super-set of all computational closures and policies is available at cloud level while each lower level has access to a sub-set of the computational closures and policies from its higher level, for example infrastructure level computational closures and policies may be a sub-set of the closures and policies of cloud level and device level closures and policies a sub-set of the infrastructure level closures and policies. Additionally, levels of the computational environment may have sets of functionally equivalent computational closures in the sense that they perform the same process and produce the same results with different levels of accuracy in return for different levels of privacy requirement. For example, a set of computations providing a map including some restricted areas with high privacy requirements, may provide the map and exclude the information associated with the restricted area, if a processing environment with sufficient privacy capability cannot be found.

In one embodiment, existence of computations with high priority in a functional flow may affect other computations, such as computations with low priorities, in the functional flow or in other functional flows. In one embodiment, one or more parameters can be associated with each, or a group of, computation closures, wherein the closure priorities can be modified by updating those parameters. For example, parameters such as "used", "unused", "available", "unavailable", "disabled", "enabled", "turbo", etc. can be assigned to closures for determining closure priorities. For example, a group of computation closures that have been disabled can be enabled through a system update, a security key, etc. in order to provide a required level of privacy.

In one embodiment, a compound privacy policy and its associated superclosures may be decomposed and matched into the computation flow (flow of computation distribution). In other embodiments, the components and levels of environment can compile, execute and submit their compound privacy policies and superclosures to the cloud so that cloud can maintain a lattice of all the available policies, compound policies, closures and superclosures throughout the multi-level computation environment. The lattice of the cloud is a superset of all the policies, compound policies, closures and superclosures that other levels of the environment such as UEs $107a$-$107i$ (components of device level) and infrastructures $117a$-$117k$ have access to. The levels of a computational environment executing at least one of the one or more computation closures, at least one functional flow, or a combination thereof, have access to root elements associated with those closures and functional flows.

In one embodiment, no differentiation is distinguished between authentication of computations in development time and run time of the end-to-end computation. The distributed computation privacy platform 103 provides early validation (at component level before the distribution) and contextual validation, wherein closure capabilities (e.g. energy consumption, security elements, privacy rules, etc.) can be represented as data. Additionally, the distributed computation privacy platform 103 may determine if certain root elements have been changed so that all policies using that element can be isolated and marked as invalid.

By way of example, the UEs $101a$-$101n$, and the distributed computation privacy platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
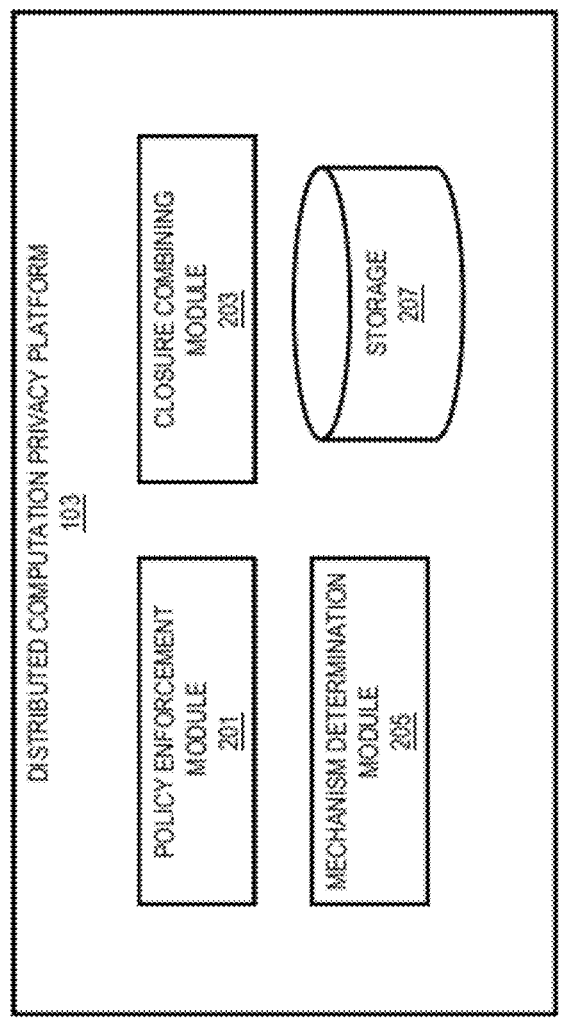
FIG. 2 is a diagram of the components of distributed computation privacy platform, according to one embodiment.

FIG. 2 is a diagram of the components of a distributed computation privacy platform, according to one embodiment. By way of example, the distributed computation privacy platform includes one or more components for providing end-to-end privacy in multi-level distributed computations. It is contemplated that the functions of these components may be combined in one or more components or performed by other components of equivalent functionality. In this embodiment, the distributed computation privacy platform includes a policy enforcement module 201, a closure combining module 203, a mechanism determination module 205, and a storage 207.

Figure 3:
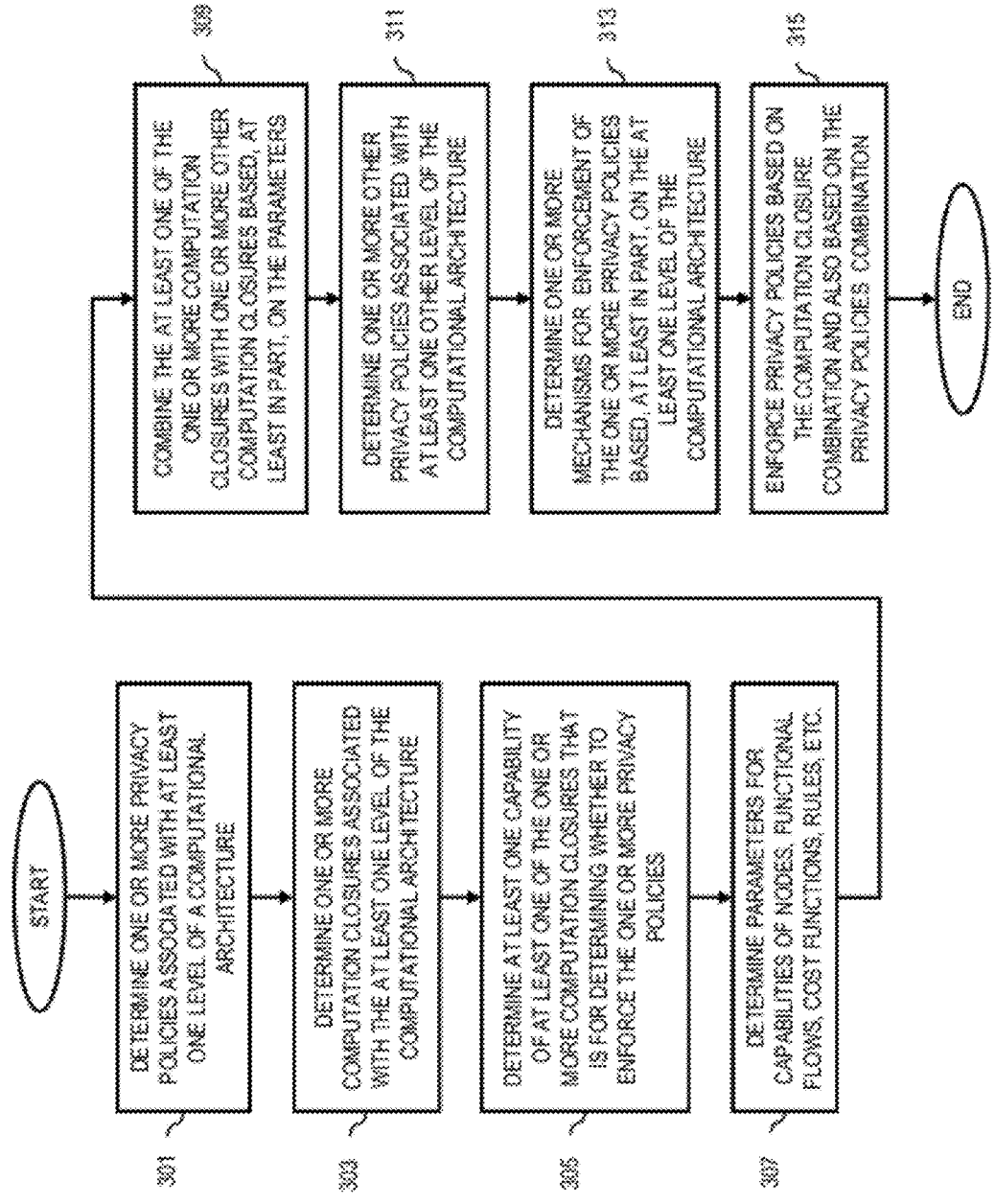
FIG. 3 is a flowchart of a process for providing end-to-end privacy in multi-level distributed computations, according to one embodiment.
Figure 12:
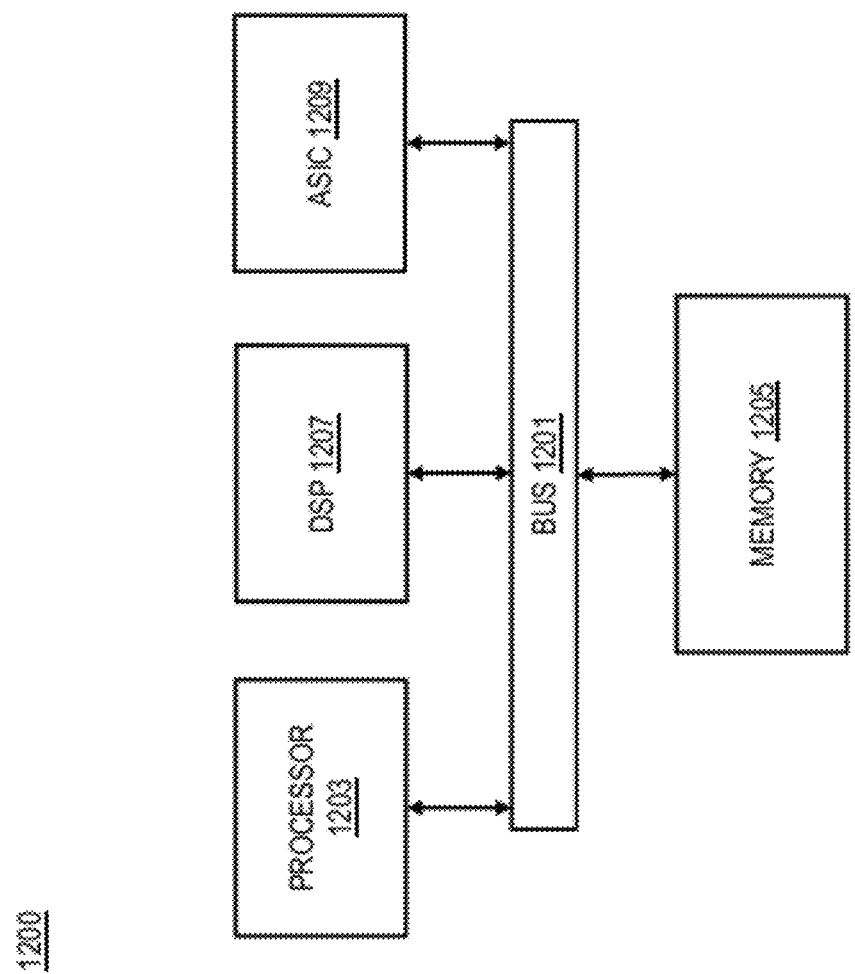
FIG. 12 is a diagram of a chip set that can be used to implement an embodiment of the invention.

FIG. 2 is described with reference to FIG. 3, wherein FIG. 3 shows a flowchart 300 of a process for providing end-to-end privacy in multi-level distributed computations, according to one embodiment. In one embodiment, the distributed computation privacy platform 103 performs the process 300 and is implemented in, for instance, a chip set including a processor and a memory as shown in FIG. 12. In one embodiment, following the start of the execution of a process (for example, associated with an application related to UE 107) the distributed computation privacy platform 103 is assigned with the task of verifying the privacy of the end-to-end distribution of computations related to the process according to privacy capabilities of devices, infrastructures and clouds and privacy configuration of the computation closures. The computation distribution may be initiated by the user of UE 107a, automatically by UE 107a based on pre-determined settings, by other devices or components associated to UE 107a, or a combination thereof. Furthermore, the initiation of computation distribution may trigger the activation of distributed computation privacy platform 103.

In one embodiment, as shown in step 301 of flowchart 300 in FIG. 3, the policy enforcement module 201 determines one or more privacy policies associated with at least one level of a computational environment within the system 100. The levels of a computational environment include, at least in part, a device level 101a-101n, an infrastructure level 117a-117k, and a cloud computation level 111a-111n. Each level of the environment may have its own privacy policies imposed by manufacturers, device owners, system administrators, management policy agreements, etc. The privacy policy associated with each level of the computational environment or associated with each component of a level of the computational environment may be locally stored in local storage units of UEs 107a-107i (not shown), of network infrastructures 117a-117k and their components such as routers, base stations, etc. (not shown), of computation clouds 111a-111n, for example in information stores 113a-113m or other storage units (not shown) or in distributed locations within the environment of communication network 105.

In one embodiment, per step 303 of FIG. 3, the policy enforcement module 201 determines one or more computation closures associated with the at least one level of the computational environment. As previously discussed with regards to FIG. 1, in a multi-level distributed computation environment, the processes within or represented by each computation closure may be executed in a distributed fashion by different levels of the environment and the processing results can be collected and aggregated into the result of the execution of the initial overall computation. In step 303 of FIG. 3, the policy enforcement module 201 determines the computation closures that are going to be executed by each level of the environment.

In one embodiment, per step 305 of FIG. 3, the policy enforcement module 201 determines that at least one capability of at least one of the one or more computation closures is for causing or for determining whether to cause, at least in part, the enforcement of the one or more privacy policies. In a distributed environment with multiple levels of execution components, multiple privacy policies for each level and multiple computation closures to be executed by various levels, having at least one computation closure that provides information associated with the enforcement of privacy policies can ensure that privacy policies are enforced wherever necessary. In one embodiment, where at least one computation closure capable of causing the enforcement of the one or more privacy policies does not exist, the policy enforcement module 201 may pre-create at least one computation closure with the desired capability for privacy policy enforcement and add the pre-created closures to the set of computation closures on which the privacy policies are going to be enforced.

In one embodiment, per step 307 of FIG. 3, the closure combining module 203 determines one or more parameters for capabilities of components (nodes) of the computational environment, functional flows, cost functions, rules, etc. These parameters enable the combination of computation closures into groups with similar characteristics which similar or same privacy policies apply to. For example, in some embodiments, certain amount of computation functionality (functional flows) can be transferred from certain devices to certain infrastructure level components or further to specific clouds depending on the available capabilities at each level and requirements of each closure. For example, for computations associated with a public device that is used commonly by multiple users, a strict privacy measure may not be necessary, while private and confidential computations may require more advanced privacy measures. In one embodiment, the one or more capabilities of the components of the levels of computational environment may include, at least in part, one or more energy consumption capabilities, one or more security enforcement capabilities, one or more privacy enforcement capabilities, one or more available resources (such as for example, connection quality, bandwidth, available memory, processing power, etc.), or a combination thereof. Furthermore, parameters such as cost functions identifying computation cost at each computational level, component, etc., rules associated with each level, component, etc. or a combination thereof can be considered while combining the closures. These parameters enable providing more cost efficient combined closure groups and provide insights for distributing the closures to components of the environment in a way to avoid conflicts between the rules of the execution environments and the rules applied on the closures that are being executed.

In one embodiment, per step 309 of FIG. 3, the closure combining module 203 causes, at least in part, a combination of the at least one of the one or more computation closures with one or more other computation closures based, at least in part, on the one or more determined parameters. As previously stated, combining the closures into groups with common policy requirements enables the enforcement of shared privacy policies on closures of each group instead of enforcing the privacy policies on every closures individually.

In one embodiment, per step 311 of FIG. 3, the policy enforcement module 201 determines one or more other privacy policies associated with at least one other level of the computational environment. As previously described, in a distributed computation environment with different levels of environment and different components, each component or level of the environment may have its own set of privacy policies which need to be combined in order for the distribution of computations among the components and level to be possible. For example, for a set of computation closures associated with a process to be distributed from a UE 107a-107i at device level to one or more components of the infrastructure level 117a-117k or to cloud level 111a-111n, at least the privacy policies of the point of origin of the closures and the destination point of the closures need to be determined and combined.

In one embodiment, per step 313 of FIG. 3, the mechanism determination module 205 processes the one or more privacy policies, the one or more computation closures, or a combination thereof to determine one or more mechanisms for the enforcement of the one or more privacy policies. The mechanisms may include, at least in part, one or more encryption mechanisms, one or more filtering mechanisms, one or more anonymization mechanisms, or a combination thereof, wherein encryption method has a direct link to security capabilities of computation closures. Filtering process may exclude one or more computation closures from the set of computation closures that is going to be executed, in order to produce a new set that its privacy requirements would match with the privacy capabilities of the execution environment. The anonymization process may make the computation closures untraceable, for example by removing the sensitive information that may also reveal closure ownerships. It is noted that various privacy policies belong to one or a combination of these main mechanisms. In one embodiment, the mechanism determination module 205 determines the one or more mechanisms based, at least in part, on the at least one level of the computational environment. It is noted that various levels of the environment may have different rules that require enforcement of specific mechanisms.

In one embodiment, per step 315 of FIG. 3, the policy enforcement module 201 processes the one or more determined privacy policies, and the one or more determined computation closures, to cause, at least in part, an enforcement of the one or more privacy policies on the computation closures. The policy enforcement module 201 uses the determined capabilities of computation closures, determined capabilities of levels of environment, determined parameters, determined mechanisms, etc. for policy enforcement process. In this process, the policy enforcement module 201 may create a mapping between the policies associated with each level of the computational environment and the computation closures that are going to be executed on the respective levels. The policy enforcement may be performed by incorporating policy related information into the data structures representing each computation closure, by associating common policies to sets of closures with shared policies, by generating specific policy data formats and creating links between the policy data and the closure data, or a combination thereof. Privacy policy enforcement enables certain applications with selected/different technologies to be executed based on the application needs, for example whether closure encryption is allowed, whether filtering is allowed and does filtering leads to information loss or lossless filtering is possible, etc. There may be different degrees as to how much policy enforcement is required and/or allowed.

Furthermore, in various embodiments the policy enforcement module 201, the closure combining module 203 and the mechanism determination module 205 may store the intermediate or final results from their processes in storage 207, access the data or the results provided by other modules and components from storage 207, or a combination thereof.

Figure 4:
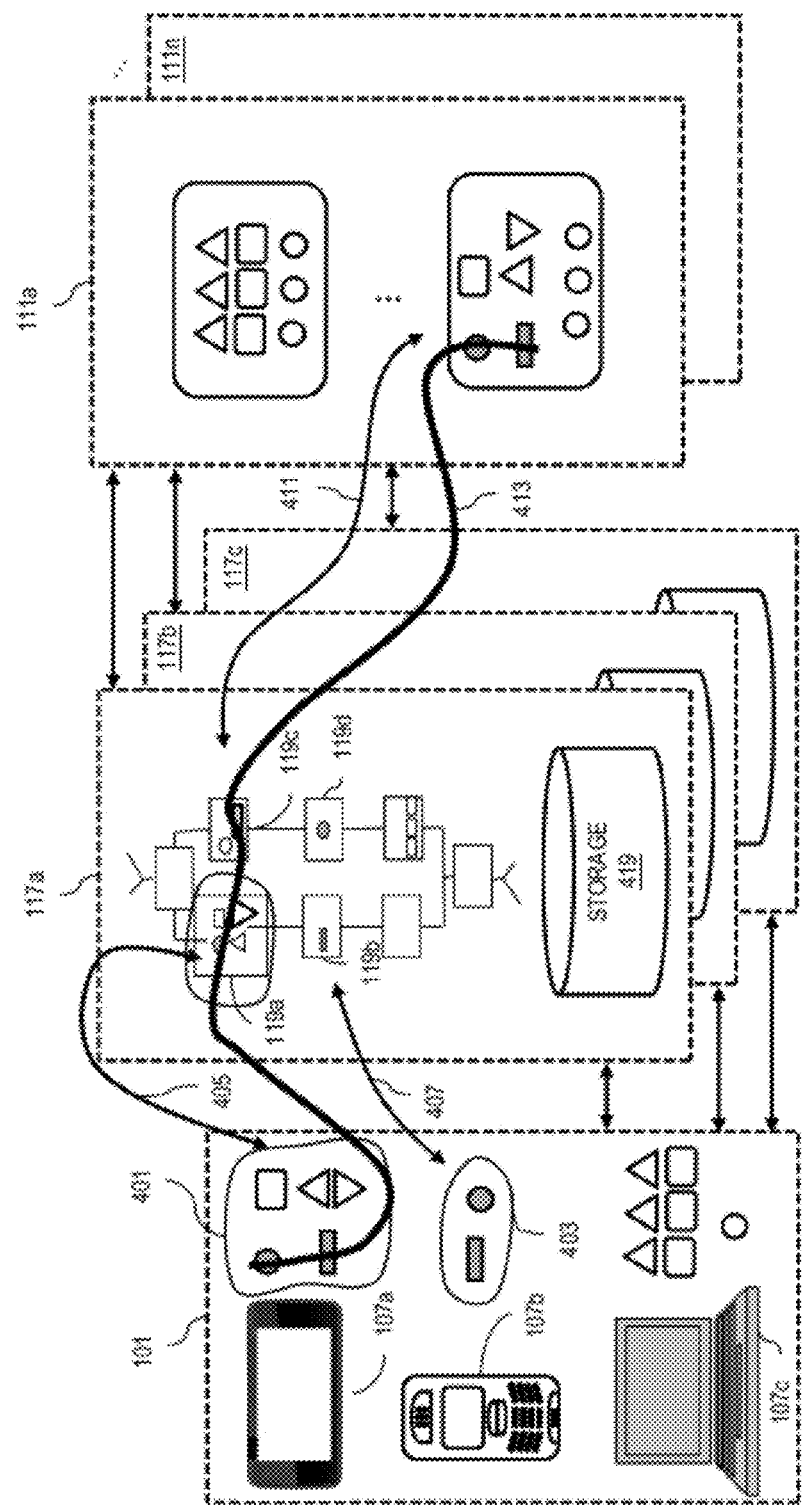
FIG. 4 is a diagram of a multi-level computation environment with privacy policy, according to one embodiment.

FIG. 4 is a diagram of a multi-level computation environment with privacy policy, according to one embodiment. In one embodiment, the set 101 comprises UEs 107a, 107b, and 107c, wherein UE 107a needs set 401 and UE 107b needs set 403 of computation closures to be executed. In closure sets 401 and 403, the geometric icons represent computation closures wherein the closures with assigned privacy policies are displayed as solidly filled icons while other closures are unfilled icons. In one embodiment, whenever the cost of privacy evaluation requirement for a set 401 or 403 of computation closures exceeds the device capability on the current level of computational environment, the computation is distributed to the next level such as infrastructure level. The distributed computation privacy platform 103 receives a request from UEs 107a and 107b for distribution of sets 401 and 403 respectively. The distributed computation privacy platform 103 uses the information provided by components such as the policy enforcement module 201 or from other levels of infrastructures 117a-117c and clouds 111a-111n of the environment, as described with respect to the flowchart of FIG. 3, in order to select a component of the infrastructure levels 117a, 117b, or 117c for the distribution of computation closures 401 and 403. In the example of FIG. 4, the privacy enforced closures of set 401 are distributed to components 119a and 119c of the infrastructure 117a as shown by arrow 405 and the privacy enforced closures of set 403 are distributed to components 119b and 119d of the infrastructure 117a shown by arrow 407. Similarly, the infrastructure 117a may distribute the closures further to one or more cloud 111a-111n shown by arrow 411. The path 413 starting from set 401 in UE 107a, continuing through components 119a and 119c of the infrastructure 117a and leading to one or more cloud 111a-111n represents a functional flow for the associated closures. Once the execution is completed, the results of execution of the distributed closures can be aggregated and returned to UEs 107a and 107b.

In one embodiment, the distributed computation privacy platform 103 may periodically receive updated information about new privacy policies and available privacy enforcing components and paths, privacy statuses and updated privacy parameters from devices, the infrastructures and the clouds. Additionally, the distributed computation privacy platform 103 may periodically request updates from the device, infrastructures and/or clouds about the availability status of privacy enforcing components and paths.

As previously discussed, the capabilities and privacy policies availability of either point of the distribution (e.g. UE 107a or component 119a) may change. For example, if a case of privacy breach is detected, the components of the distributed computation privacy platform 103 determine the changes and adjust the policies, capabilities, parameters accordingly for the distributed computation privacy platform 103 to troubleshoot and detect cause of the breach and prevent the event from happening again. It is noted that storage 419 may be used for the storage of local data associated with the components of the infrastructures 117a-117c such as component capabilities, requirements, etc.

Figure 5B:
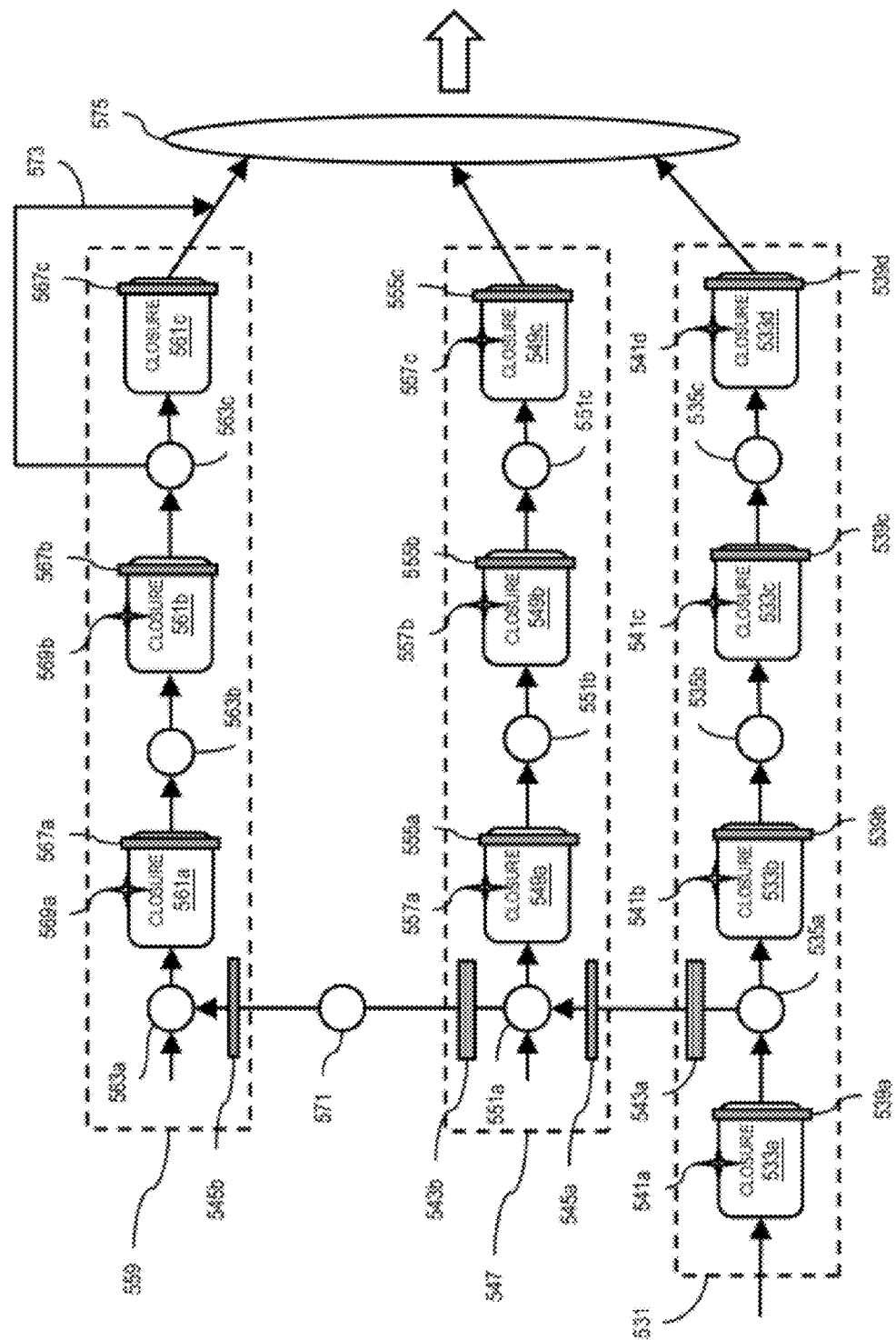

FIGS. 5A-5B are diagrams of distribution of privacy enforced computations in multi-level computational environment, according to one embodiment. FIG. 5A is a general representation of computation distribution. As seen in FIG. 5A, the computation distribution starts at a component 501 of an architectural level (not shown). Each component may execute a set of closures that constitute a computation branch. For example, the branch 501 is composed of closures 503a-503d, wherein every two consecutive closures are connected via a connector and computational branches are communicating via connectors as well. For example, connectors 505a-505c connect closures 503a-503d. Connectors may also transfer information and data associated with a closure and its execution results to the next closure in the branch or to other branches. Additionally, connectors may function as links between related branches that constitute a distributed computation.

In one embodiment, connectors may contain information about parameters such as privacy requirement and/or capabilities, functional flows, distribution maps, links between closures and architectural levels, etc. Arrows connecting closures to connectors and connectors to next closures show the functional flow adopted based on the parameters. As seen in FIG. 5A, the closures have been distributed from component 501 to component 507 via communication between connector 505a and connector 511a. The computation branch of component 507 includes closures 509a-509c communicating via connectors 511b and 511c, while branches 501 and 507 communicate via connectors 505a and 511a. Similarly, a third branch 513 has been formed of closures 515a-515c being executed at component 513 and connected by connectors 517b and 517c, while the branch communicates with other branches via connector 517a.

In one embodiment, the initial branch 501 may be in a UE 107a-107i, the second branch 507 in a component of the infrastructure 117a-117n, and the third branch in another component of the same infrastructure, a different infrastructure, in a cloud, or a combination thereof.

FIG. 5B shows a computation distribution together with various parameters affecting the distribution. As seen in FIG. 5B, the computation distribution starts at a component 531 of an architectural level (not shown). Each component may execute a set of closures that constitute a computation branch. For example, the branch 531 is composed of closures 533a-533d, wherein every two consecutive closures are connected via a connector and computational branches are communicating via connectors as well. For example, connectors 535a-535c connect closures 533a-533d and connector 571 connects branches 547 and 559. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities including privacy requirements and availability, a cost function, functional flow specifications, distribution maps, links between closures and architectural levels, etc. Arrows connecting closures to connectors and connectors to next closures show the functional flow adopted based on the parameters. For example, star signs 541a-541d, 557a-557c, and 569a-569b, represent privacy policy rules imposed on the closures and the signs 545a-545b represent the policy rules imposed on superclosures (e.g., combined closures provided by the closure combining module 203) by the user of UEs 107a-107i, default by the manufacturer of UEs 107a-107i, by the infrastructures 117a-117k, by the clouds 111a-111n, or a combination thereof, and associated with each closure 533a-533d, 549a-549c, and 561a-561c respectively. Additionally, blocks 539a-539d, 555a-555c, and 567a-567c represent processed privacy policies associated with one or more closures, and blocks 543a-543b represent combination of privacy policies for one or more superclosures. In the example of FIG. 5B, the privacy policy 539a shows the policy for closure 533a based on the privacy rules 541a. In one embodiment, if privacy policy 539a is in accordance with rules 541a, the imposed policies are validated and the closure 533a can be distributed, however if policies 539a contradict any rule of rules 541a, the closure 533a will be identified as non-distributable by the distributed computation privacy platform 103.

In one embodiment, the block 543a represents a combined policies composed by the policy enforcement module 201 from a set of policies 539a-539d and block 545a represents combined privacy rules of component 547 of the multi-level computation environment. In this embodiment, if the distributed computation privacy platform 103 detects a contradiction between the combined policies 543a and the combined rules 545a, the closure distribution may be terminated. Subsequently, the distributed computation privacy platform 103 may alarm the component 531 of privacy breach, investigate the issue and find the faulty component, suggest solutions to overcome the problem or a combination thereof.

In one embodiment, a closure or a group of closures may lack access to privacy policy rules for the verification of their imposed privacy. For example, in FIG. 5B the closure 561c is assigned with policy 567c with no privacy rules. In this embodiment as seen by arrow 573, the distributed computation component that is executing branch 559 bypasses closure 561c without executing the computation 561c. Alternately, the component may request for privacy rules for closure 561c from the distributed computation privacy platform 103.

In one embodiment, a repository of predefined or previously used privacy rules can be maintained so that any computations with missing privacy rules can be compared against the repository and a suitable rule can be assigned to them from the repository content, for example based on the similarities that may exist between the computations with missing privacy rules with other computations with privacy rules in the repository. The rule assignment can be for a temporary period until the exact rule for the computations is found, requested, borrowed, generated, extended from other alike computations within the same functional flow, from neighboring computation closures, etc.

The final results from closure execution of the three branches 531, 547, and 559 are aggregated by result aggregator 575 and forwarded to the requesting device.

In one embodiment, on each level of the environment one or more of computation closures 533a-533d, 549a-549c, or 561a-561c may be pre-created closures created by the distributed computation privacy platform 103, wherein the pre-created closure includes information about enforcement of the one or more privacy rules 541a-541d, 557a-557c, and 569a-569b respectively on the closures and as a result produce imposed privacy policies 539a-539d, 555a-555c, and 567a-567c. The pre-created closures may also produce combined privacy policies 543a, 543b or combined privacy rules 545a, 545b, etc.

In the embodiment of FIG. 5B, the privacy mechanisms and rules can be different for each domain or each level of the computation infrastructure. The privacy rules may also overlap and allow the privacy execution domain to be extended to one or all levels of the infrastructure. In other words, every computation closure and every branch or functional flow of computation closures may enable and utilize different privacy mechanisms and rules.

Additionally, different privacy mechanisms (e.g. encryption, filtering, anonymization) can be used in combination with computation closures capabilities (e.g., energy consumption, security, privacy and connection quality). The policy enforcement module 201 can take into account different capabilities with or without different privacy policy mechanisms. The policy enforcement module 201 enables execution of applications with selected/different technologies based on application requirements, such as for example, whether encryption is allowed, whether filtering with data loss is allowed or not, etc. The distributed computation privacy platform 103 can be calibrated to provide different degrees of privacy enforcement based on capabilities and requirements of the entities involved.

Figure 6:
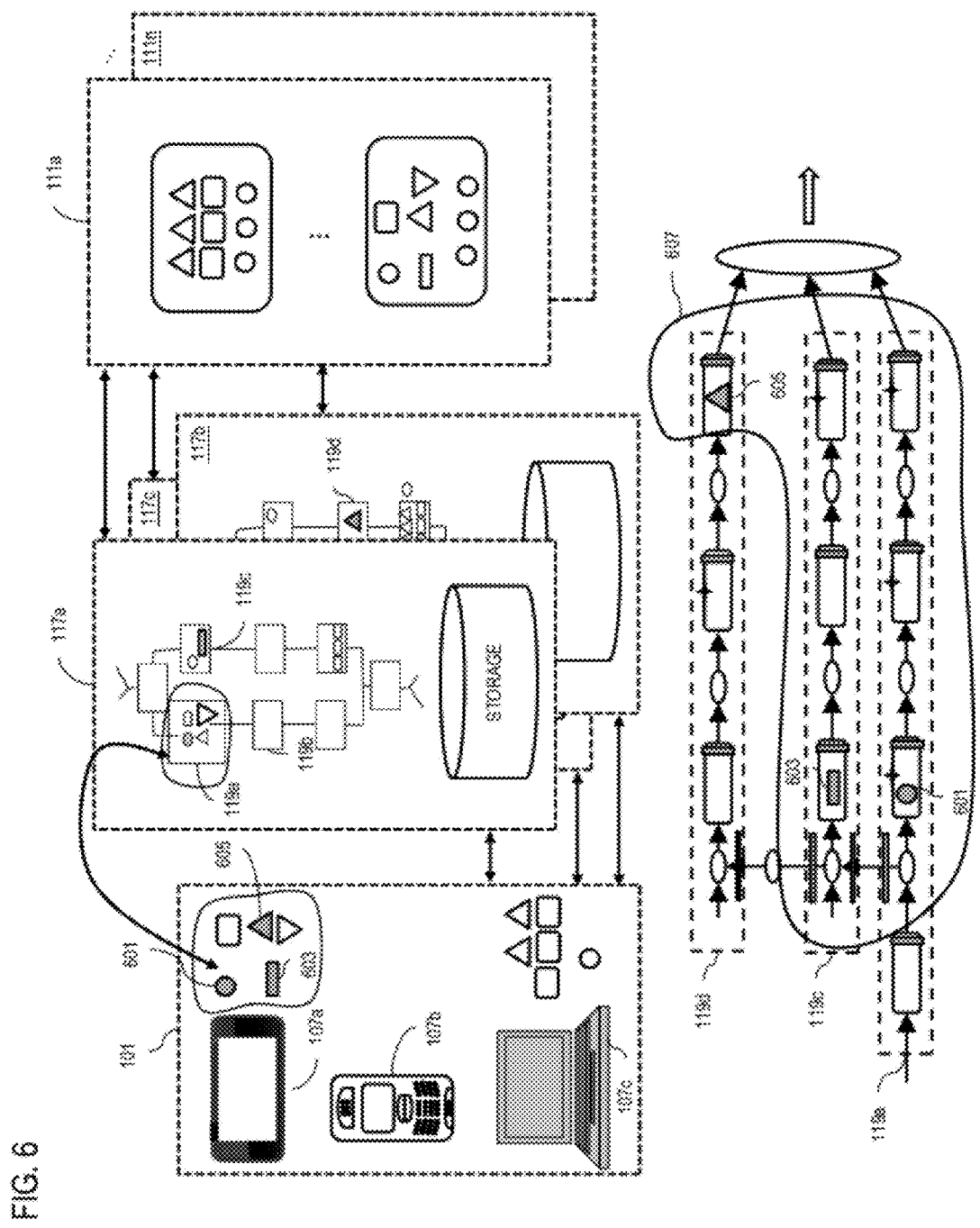
FIG. 6 is a diagram of policy application for end-to-end privacy in distributed computations in multi-level computational environment, according to one embodiment.

FIG. 6 is a diagram of policy application for end-to-end privacy in distributed computations in multi-level computational environment, according to one embodiment. In one embodiment, privacy rules have been assigned to closures 601, 603, and 605 of a process associated with UE 107a. In the example of FIG. 6, the closure 605 is supposed to be executed on the combined result from the execution of closures 601 and 603. The closure 601 is executed at a component 119a of the infrastructure level 117a, while closure 603 is transferred to component 119c of level 117a (e.g. another device in infrastructure level) for execution. In this embodiment, before a closure (601 or 603) is transferred to a component (119a or 119c), the distributed computation privacy platform 103 verifies that the privacy capabilities of component 119a and 119c of the environment level 117a are satisfactory for the privacy requirements of the closures 601 and 603 and the transfer will take place only if the respective components have sufficient capabilities. In this example the closures 601 and 603 can be executed in parallel at different components 119a and 119c.

In one embodiment, upon the completion of the execution the result is returned to the original device 107a. However, the path via which the results are being sent to UE 107a should be once again verified by the distributed computation privacy platform 103 to comply with the privacy requirements of both closures 601 and 603 and also with any additional privacy rules that may apply to the results. The returned results may then, together with closure 605, be transferred for execution to a component 119d of the infrastructure level 117b. If the infrastructure levels lack any privacy capabilities, or non-privacy capabilities (e.g. processing power, etc.) the closures may be executed at the cloud level 111a-111n. The final execution results are also returned to 107a to be presented to the user, utilized by running applications, etc. The area within shape 607 shows the computation flow of closures 601, 603, and 605 according to the privacy policy rules (utilized for determining the distribution path)

In one embodiment, the infrastructure components 119a, 119c and 119d will not be able to decrypt the closures 601, 603, and 605 since the closures are protected by privacy policy rules. The closures and their execution results can only be decrypted by the entity allowed by the privacy policies (e.g. UE 107a). However, the components of the execution environment can manipulate (e.g. execute) the encrypted copy of the closures without decrypting them and return the results to the requesting device 107a.

In one embodiment, various mechanisms of the privacy policy enforcement are utilized by the distributed computation privacy platform 103. The main mechanism categories include encryption, filtering, and anonymization. Each mechanism has a set of capabilities and is defined for closures (e.g. attached to device(s) and their channels). The capabilities of devices, components and architectural levels can be identified as various parameters such as for example, energy consumption, security level, privacy level, connection quality, etc. Furthermore, each closure may have different capabilities and requirements and the closures can be associated with defined capabilities and requirements in form of signatures (e.g. policy assigning signatures) or supersignatures (combined policy assignment).

In one embodiment, closure capabilities or various types can be combined with each other, for example a closure signature may identify both privacy and energy consumption for the closure, another signature may identify a combination of privacy, energy, and security capabilities, etc.

In one embodiment, a policy may enforce a method of "lossless" encryption, where the amount of information has to remain the same (e.g., the closure may not lose any information as a result of encryption).

In one embodiment, different privacy mechanisms may be allowed at different levels of the computation environment. For example, the device level 101 may recognize only encryption and the infrastructure level 117a-117c may allow only filtering, while the cloud level 111a-111n may allow all mechanisms encryption, filtering and anonymization.

In one embodiment, closure capabilities may overlap with defined mechanisms. For example, a UE 107a may have a low battery power. Therefore, the UE 107a may not be a suitable choice for information sharing by other devices at the time of low battery power in order to not violating privacy, losing parameters, losing closure values, etc. (e.g. the UE with low battery power may not be capable of applying decryptions).

In one embodiment, different privacy mechanisms can be used with computation closures capabilities. The policy enforcement module 201 can take into account different capabilities with or without different privacy policy mechanisms. The encryption, filtering, anonymization mechanisms can be combined with computational closure capability parameters such as energy, security, privacy, and connection quality).

In one embodiment, privacy policies as described are linked with functional flow elements (capabilities) through capabilities metrics, energy and security. Additionally, privacy can be applied to many systems, providing probabilistic and logical approach with computation closures. Different privacy mechanisms can be used with computation closure capabilities. Furthermore, privacy policy enforcement can take into account different capabilities with or without different privacy policy mechanisms.

Figure 7A:
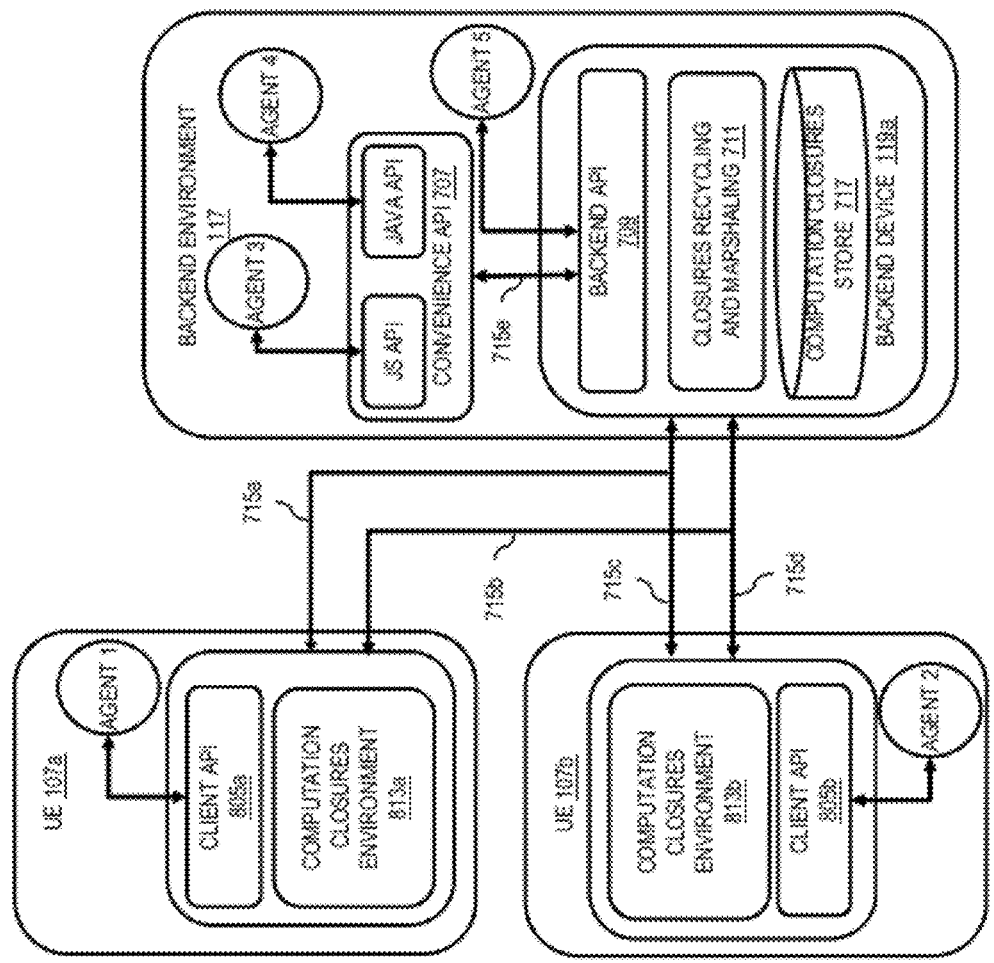
FIGS. 7A-7B are diagrams of computation distribution among devices, according to one embodiment.
Figure 7B:
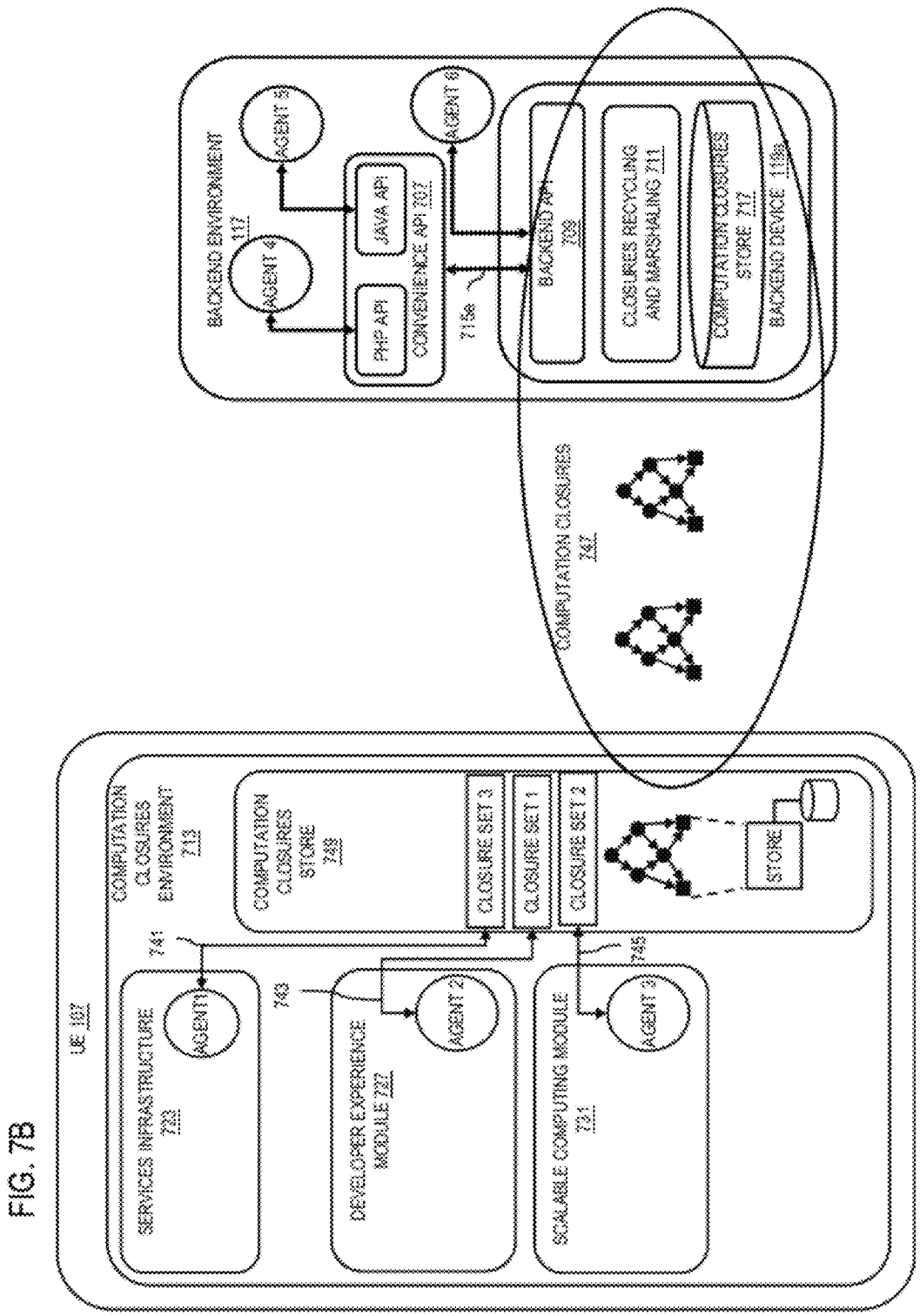

FIGS. 7A-7B are diagrams of computation distribution among devices, according to one embodiment. In one embodiment, in FIG. 7A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 707 that may include APIs tailored to the software development environments used (e.g. JAVA, PHP, etc.). Furthermore, UEs 107a and 107b may include client APIs 705a and 705b. Each API enables interaction between devices and components within another device or an environment. For example, backend API 709 enables interaction between the backend device 119a and Agent5, and convenience API 707 enables interaction between the backend device 119a and agents Agent3 and Agent4, wherein each agent is a set of processes that handle computation closures within the backend environment 117. APIs 705a and 705b enable interaction between UE 107a and agent Agent1, and UE 107b and agent Agent2 respectively. As seen in the example of FIG. 7A, Agent3 works under PHP while Agent4 is a JAVA process. Each of the UEs 107a and 107b has a computation closure environment 713a and 713b which may be part of a cloud 111. Arrows 715a-715e represent distribution path of computation closures among the environments 713a, 713b and the computation closures store 717. The computation closures store 717 is a repository of computation closures that can be accessed and used by all the UEs and infrastructure components having connectivity to the backend environment 117.

In one embodiment, the backend device 119a may be equipped with a closure recycling and marshaling component 711 that monitors and manages any access to the computation closures store 717. In other embodiments the closure recycling and marshaling (i.e. standardization for uniform use) may be a function of the distributed computation privacy platform 103.

In one embodiment, the computation closures within environments 713a, 713b and the computation closures store 717 may be composed based on anonymous function objects and automatically created by a compiling system using methods for generating anonymous function objects such as lambda expressions.

FIG. 7B is an expanded view of a computation closure environment 713 as introduced in FIG. 7A. The computation closure environment 713 may be composed of one or more computation closure generating components. In one embodiment the computation closure environment 713 has a services infrastructure 723 that provides various services for the user of the UE 107. The services may include any application that can be performed on the UE 107 such as, games, music, text messaging, voice calls, etc. In one embodiment, the services infrastructure 723 provides support for closure distribution under the supervision of a distributed computation privacy platform 103 as discussed in FIG. 1, FIG. 2, and FIG. 3. The agent Agent1 retrieves the computation closures required by the services infrastructure 723 from the computation closures store 749 and stores the newly generated computation closures by the services infrastructure 723 into the computation closures store 749 for distribution purposes per arrow 741.

In another embodiment, the computation closure environment 713 has a developer experience module 727 that provides various tools for a developer for manipulating services offered by the UE 107. The tools may include standardized and/or abstract data types and services allowing the developers to chain processes together across development platforms. In one embodiment, the developer experience module 727 provides cross platform support for abstract data types and services under the supervision of a distributed computation privacy platform 103 as discussed in FIG. 1. The agent Agent2 retrieves the computation closures required by the developer experience module 727 from the computation closures store 749 and stores the newly generated computation closures by the developer experience module 727 into the computation closures store 749 for distribution purposes per arrow 743.

In yet another embodiment, the computation closure environment 713 has a scalable computing module 731 that provides an abstract wrapper (i.e. monadic wrapper) for the migrating closures 401. This abstraction provides computation compatibility between the closures 401 and the UE 107. The abstract wrapper may provide scheduling, memory management, system calls and other services for various processes associated with the closures 401. These services are provided under the supervision of the distributed computation privacy platform 103 as discussed in FIG. 1. The agent Agent3 retrieves the computation closures required by the scalable computing module 731 from the computation closures store 749 and stores the newly generated computation closures by the scalable computing module 731 into the computation closures store 749 for distribution purposes per arrow 745. In one embodiment, the backend environment 117 may access the computation closures store 749 and exchange/migrate one or more computer closures 747 between the computation closures store 749 and the backend computation closures store 717.

Figure 8:
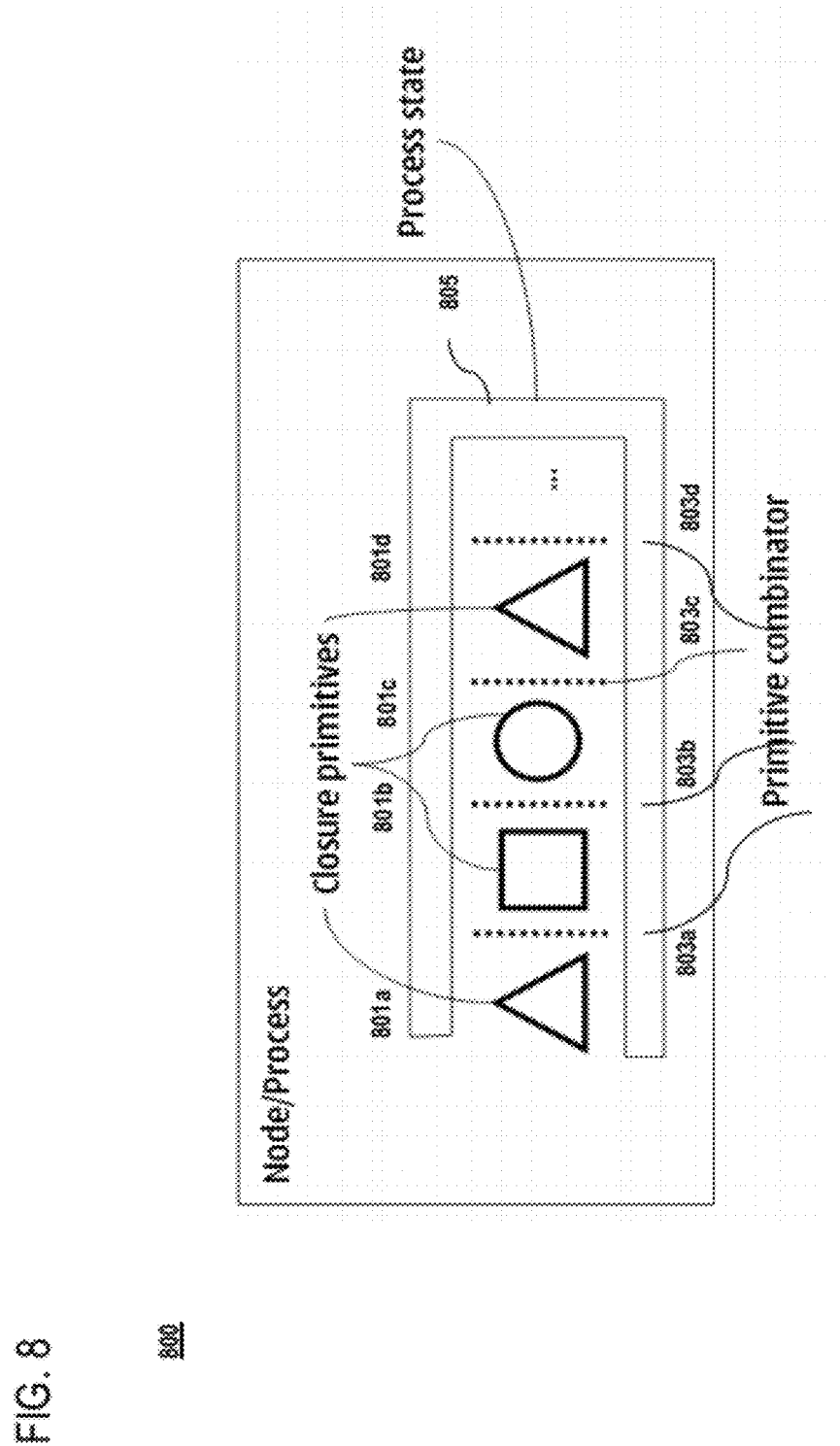
FIG. 8 is a diagram showing a process as a combination of primitive computation closures, according to one embodiment.

FIG. 8 is a diagram showing a process as a combination of primitive computation closures, according to one embodiment. Process 800 consists of closure primitives 801a-801d. The closure primitives 801a-801d, which are similar to geometric icon closures of FIG. 4, are combined with each other into process 800 by combinators 803a-803d. The object 805 represents the execution requirements including process states under which the execution of closures 801a-801d combined by combinators 803a-803d will result in the process 800.

In one embodiment, distribution of process 800 includes distribution of closures 801a-801d, combinators 803a-803d and the process states 805 as independent elements into, for instance, an infrastructure environment 117. The independent closures 801a-801d from infrastructure environment 117 may be distributed into different components 119a-119m where they may be executed.

Figure 9:
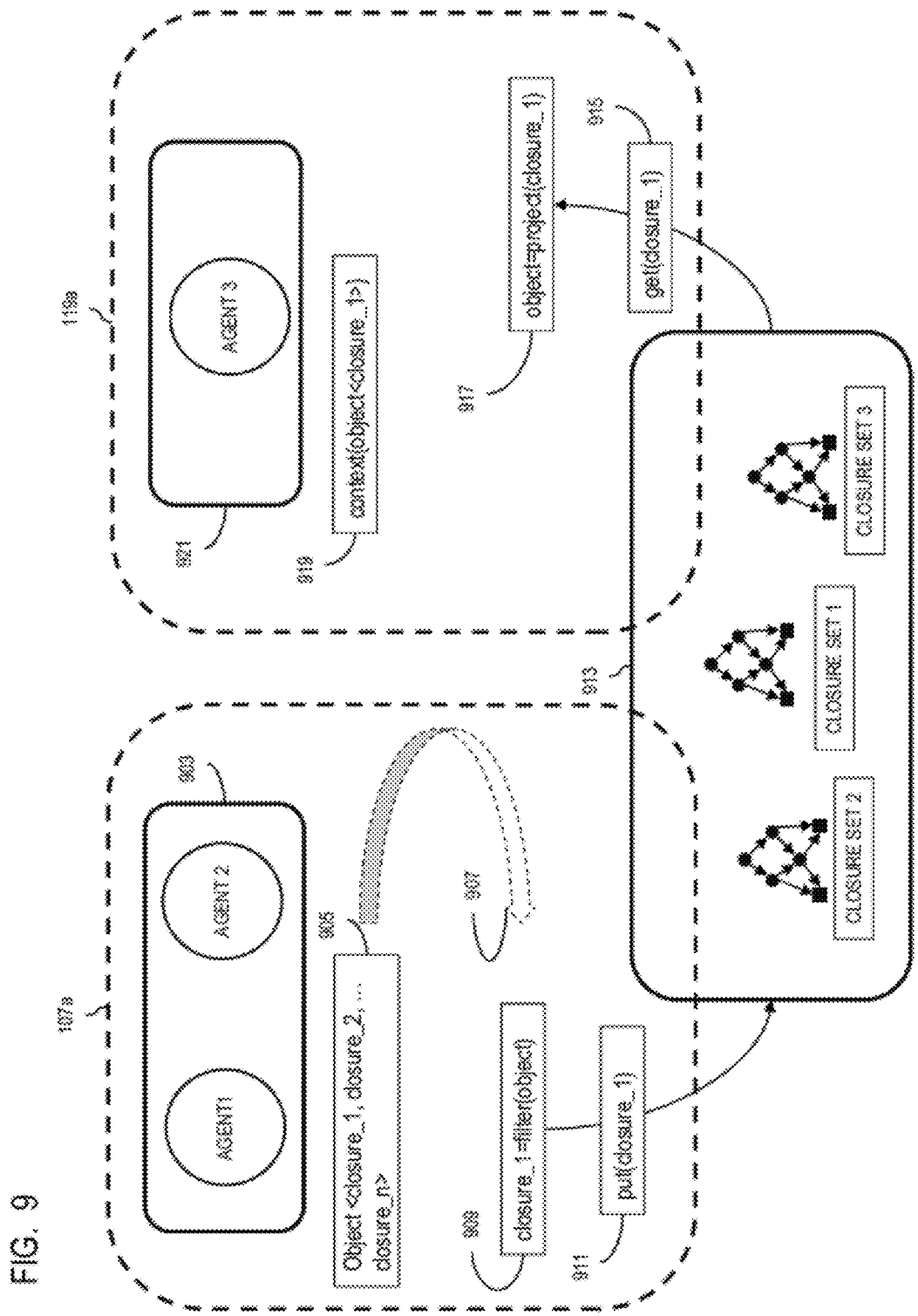
FIG. 9 is a diagram of process distribution from a device to another device, according to one embodiment.

FIG. 9 is a diagram of process distribution from a device to another device, according to one embodiment. In one embodiment, the device 107a is a UE associated with the user. The UE 107a may include a user context 903 which is being migrated among devices. Agent1 and agent2 are processors that calculate and handle computation closures within the user context 903. The number of agents may be different in different devices based on their design, functionality, processing power, etc. Block 905 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 9, the filtering process 907 extracts closure_1 from the closure set Object via filtering the set (shown in block 909). The extracted closure_1 is added to a computation closure store 913 using the exemplary Put command 911.

It is assumed, in this example, that component 119a of an infrastructure level (not shown) is selected by the distributed computation privacy platform 103 as a destination for closure distribution from UE 107a, based on the availability of sufficient privacy. The extracted computation closure, closure_1 is migrated to component 119a following the assignment of a distribution path (similar to path 413 in FIG. 4, and is executed on component 119a.

In one embodiment, the component 119a receives the computation closure closure_1 and extracts it from the computation closure store 913 using the Get command 915. The extracted closure_1 is projected into a closure with the user device context and the object 917 is produced. The block 919 represents the reconstruction of the closure into the initial context by a component in charge of the execution. The aggregated context may then be executed in the run-time environment 921 of component 119a by Agent3.

In another embodiment, the UE 107a and component 119a may exchange places and the distribution is performed from the component 119a to UE 107a or both devices may be UEs. In this embodiment the decomposition and aggregation processes are similar to the above example.

Figure 10:
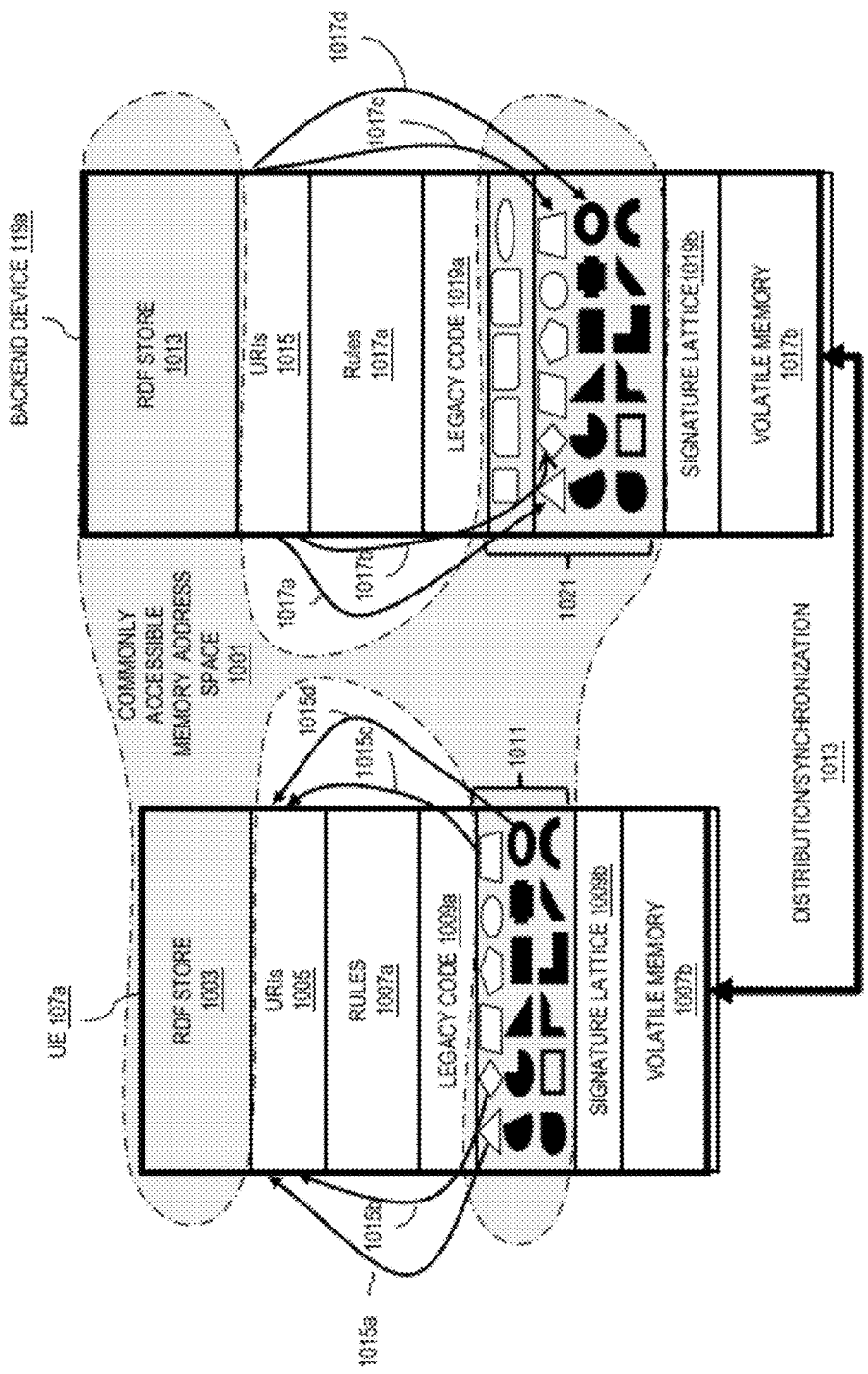
FIG. 10 is a diagram of computation closure allocation/mapping, according to one embodiment.

FIG. 10 is a diagram of computation closure allocation/mapping, according to one embodiment. The diagram of FIG. 10 shows a commonly accessible memory address space 1001 formed between a UE 107a as a client and the backend device 119a as a component of a computation infrastructure 117.

In one embodiment, the UE 107a may include RDF store 1003, which holds computation closures for processes associated with the UE 107a. Similarly the backend device 119a may includes a RDF store 1013, which holds computation closures associated with processes related to device 119a, UEs 107a-107i, or any other devices having connectivity to device 119a or cloud 111.

In other embodiments, the Uniform Resource Identifiers (URIs) 1005 in UE 107a and 1015 in backend device 119a may be used to identify names or resources accessible to their respective devices via the communication network 105. Additionally, UE 107a and backend device 119a may have rule sets 1007a and 1017a that include privacy rules imposed on device similar to rules 569a-569b of FIG. 5B. It is noted that the rule base 1007a of UE 107a may be a subset of the rule base 1017a of the backend device 119a, wherein the rules 1017a is a subset of a superset of rules managed by a cloud 111. Furthermore, the legacy codes associated with each device may be stored in legacy code memory areas 1009a and 1009b on UE 107a and 1019a and 1019b on backend device 119a.

In one embodiment, UE 107a may be provided with a non-volatile memory space 1011 as a closure store. The closure store 1011 may include a set of closure primitives shown as geometric objects, similar to primitives of sets 401 or 403 of FIG. 4. Similarly, the backend device 119a may be provided with a non-volatile memory space 1021 as a closure store. The closure store 1021 may also include a set of closure primitives shown as geometric objects. In one embodiment, the closure store 1011 is a subset of closure store 1021 determined, at least in part, based on one or more criteria such as time of access, frequency of access, a priority classification, privacy settings, etc. The geometric shapes of closure stores 1011 and 1021 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 1007a, 1007b, 1017a, and 1017b), the capacity of non-volatile memory on a UE 107a-107i is limited. However, a backend device 119a, serving high numbers of users, may be equipped with larger volumes of non-volatile memory spaces. Because of the limited capacity of non-volatile memory spaces on UEs 107a-107i, and also because differing levels of privacy setup on various devices, only a subset of the closure store 1021 is stored locally at the closure store 1011 for local use by the UE 107a. In order to minimize the number of times a UE 107 needs to retrieve one or more primitives from closure store 1021 of device 109a, the subset 1011 is determined based on one or more criteria. In one embodiment, the closure store 1011 may be determined as a set of the most frequently accessed closure primitives of closure store 1021 by UE 107a. In another embodiment, the closure store 1011 may be determined as a set of the most recently accessed closure primitives of closure store 1021 by UE 107a. In other embodiments, various combined conditions and criteria may be used for determining subset 1011 from set 1021 as the content of closure store for UE 107a. Furthermore, the closure stores 1011 and 1021 may be periodically synchronized. The synchronization of closure stores ensures that any changes (addition, deletion, modification, etc.) in closure primitives and in root elements of the signature lattice of closure store 1021 are reflected in the closure store 1011.

In one embodiment, for execution of a closure set 401 (a subset of closure store 1011) associated with a process on UE 107a, the set 401 can be migrated under the supervision of the distributed computation privacy platform 103 and after verification of the privacy of closures and capabilities of the destination component, to the backend device 119a which is a component of the infrastructure 117 (the distribution path shown as arrow 1023). The distributed computation privacy platform 103 may then inform the processing components of the UE 107a, the backend device 119a or a combination thereof (the processing components are not shown), that the privacy of closure primitives has been approved and the closures are ready for execution. Alternatively, the distributed computation privacy platform 103 may determine that the closures are not approved from point of view of the privacy and terminate their distribution and execution.

In one embodiment, any changes on the closure store 1021 of the backend device 119a (e.g., addition, deletion, modification, etc.) may first enter the URIs 1015 via the communication network 105. The changes may then be applied from URIs 1015 on closure store 1021 shown by arrows 1027a-1027d. Similarly, the closure store 1011 is updated based on the content of the closure store 1021 and the updates are shared with other authorized components within UE 107a (e.g. with URIs 1005 as shown by arrows 1025a-1025d).

In one embodiment, the commonly accessible memory address space 1001 is formed from the RDF stores 1003 and 1013 and the closure stores 1011 and 1021. The commonly accessible memory address space 1001 can be accessed as a continuous memory space by each of the devices 107a and 119a.

The processes described herein for providing end-to-end privacy in multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
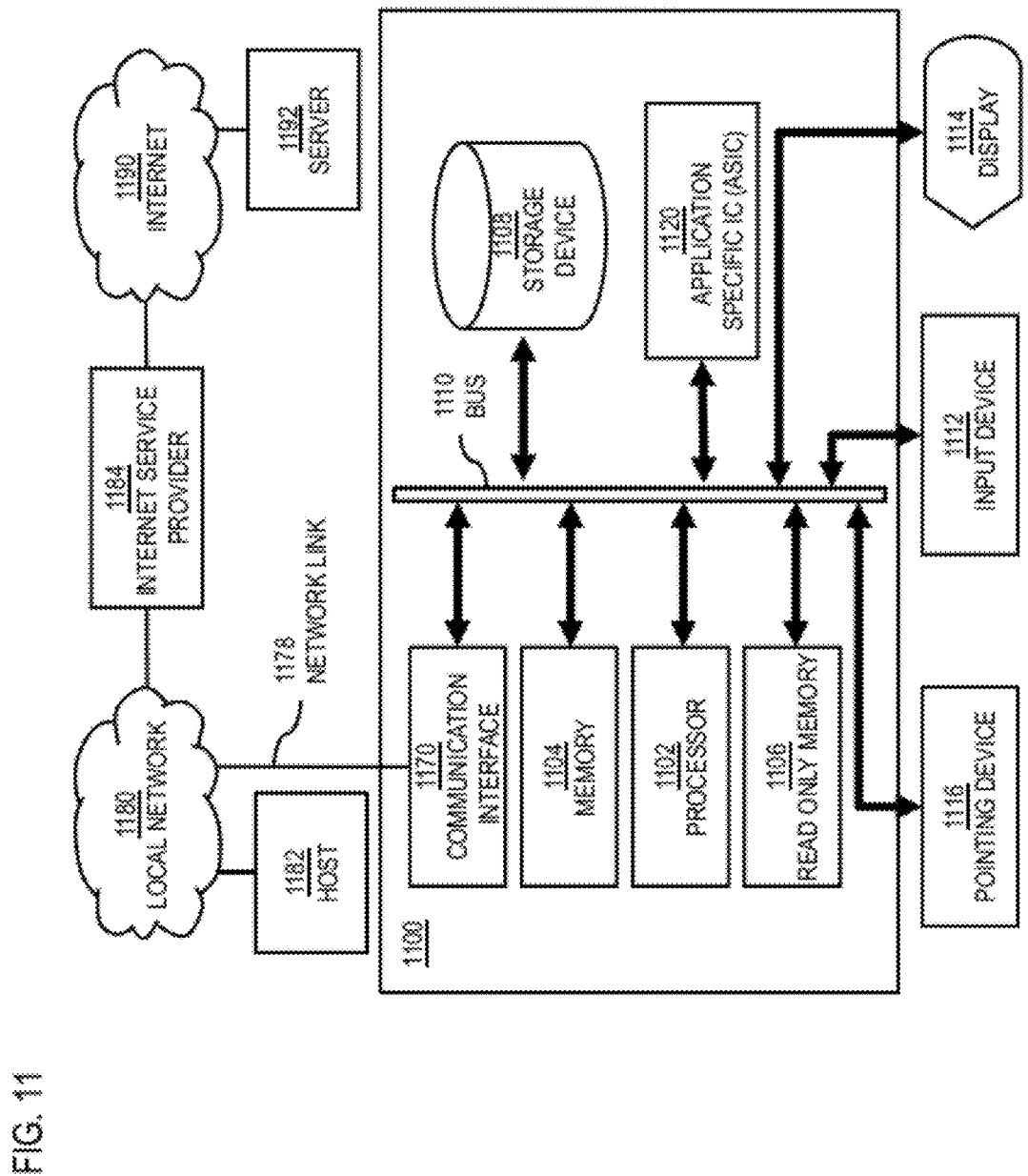
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG.

11 can deploy the illustrated hardware and components of system 1100. Computer system 1100 is programmed (e.g., via computer program code or instructions) to provide end-to-end privacy in multi-level distributed computations as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing end-to-end privacy in multi-level distributed computations.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing end-to-end privacy in multi-level distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing end-to-end privacy in multi-level distributed computations. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing end-to-end privacy in multi-level distributed computations, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing end-to-end privacy in multi-level distributed computations to the UEs 107a-107i.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, PCM (Phase Change Memory), any other NVM (Non Volatile Memory), any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide end-to-end privacy in multi-level distributed computations as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing end-to-end privacy in multi-level distributed computations.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide end-to-end privacy in multi-level distributed computations. The memory 1205 also stores the data associated with or generated by the execution of the inventive steps.

Figure 13:
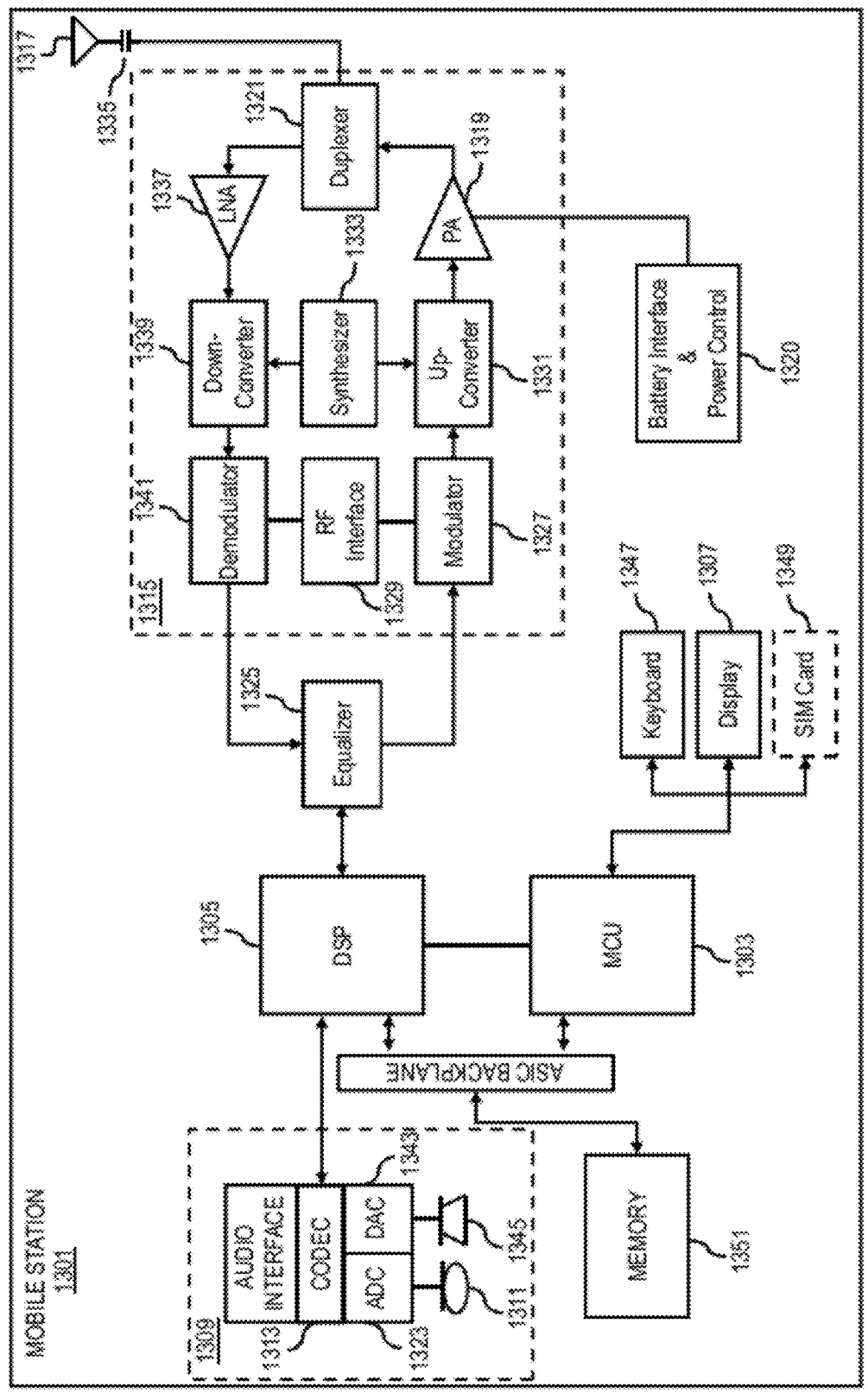
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing end-to-end privacy in multi-level distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing end-to-end privacy in multi-level distributed computations. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide end-to-end privacy in multi-level distributed computations. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    one or more privacy policies associated with at least one level of a computational environment;
    one or more computation closures associated with the at least one level of the computational environment; and
    a processing, by a processor, of the one or more privacy policies and the one or more computation closures to determine whether to cause, at least in part, an enforcement of the one or more privacy policies by issuing a request for one or more higher privacy capabilities or replacing the one or more computation closures with one or more lower privacy requiring computation closures when the one or more computation closures are transferred to the at least one level of the computational environment that does not have sufficient one or more privacy capabilities from at least one other level of the computational environment,
    wherein a combination of at least one of the one or more computation closures with one or more other computation closures is based, at least in part, on one or more parameters and the enforcement of the one or more privacy policies is based, at least in part, on the combination.

2. A method of claim 1, wherein the (1) data and/or (2) information and/or (3) at least one signal are further based, at least in part, on the following:
    at least one determination that at least one capability of the at least one of the one or more computation closures is for causing, at least in part, the enforcement of the one or more privacy policies.

3. A method of claim 1, wherein the one or more parameters include, at least in part, one or more capabilities of nodes of the computational environment, at least one functional flow of the one or more computation closures, one or more cost functions, one or more rules, or a combination thereof.

4. A method of claim 3, wherein the one or more capabilities include, at least in part, one or more energy consumption capabilities, one or more security enforcement capabilities, one or more privacy enforcement capabilities, one or more available resources, or a combination thereof.

5. A method of claim 1, wherein the (1) data and/or (2) information and/or (3) at least one signal are further based, at least in part, on the following:
    a pre-creation of the at least one of the one or more computation closures.

6. A method of claim 1, wherein the (1) data and/or (2) information and/or (3) at least one signal are further based, at least in part, on the following:

one or more other privacy policies associated with the at least one other level of the computational environment, wherein the enforcement comprises enforcing a combination of the one or more privacy policies and the one or more other privacy policies.

7. A method of claim 1, wherein the (1) data and/or (2) information and/or (3) at least one signal are further based, at least in part, on the following:
a processing of the one or more privacy policies, the one or more computation closures, or a combination thereof to determine one or more mechanisms for the enforcement of the one or more privacy policies.

8. A method of claim 7, wherein the one or more mechanisms include, at least in part, one or more encryption mechanisms, one or more filtering mechanisms, one or more anonymization mechanisms, or a combination thereof.

9. A method of claim 7, wherein the (1) data and/or (2) information and/or (3) at least one signal are further based, at least in part, on the following:
at least one determination of the one or more mechanisms based, at least in part, on the at least one level of the computational environment.

10. An apparatus comprising:
at least one processor; and
at least one memory including computer program code for one or more programs,
the at least one memory and the computer program code configured to, with the at least one processor, cause the apparatus to perform at least the following,
determine one or more privacy policies associated with at least one level of a computational environment;
determine one or more computation closures associated with the at least one level of the computational environment; and
process and/or facilitate a processing of the one or more privacy policies and the one or more computation closures to determine whether to cause, at least in part, an enforcement of the one or more privacy policies by issuing a request for one or more higher privacy capabilities or replacing the one or more computation closures with one or more lower privacy requiring computation closures when the one or more computation closures are transferred to the at least one level of the computational environment that does not have sufficient one or more privacy capabilities from at least one other level of the computational environment,
wherein a combination of at least one of the one or more computation closures with one or more other computation closures is based, at least in part, on one or more parameters and the enforcement of the one or more privacy policies is based, at least in part, on the combination.

11. An apparatus of claim 10, wherein the apparatus is further caused to:
determine that at least one capability of the at least one of the one or more computation closures is for causing, at least in part, the enforcement of the one or more privacy policies.

12. An apparatus of claim 10, wherein the one or more parameters include, at least in part, one or more capabilities of nodes of the computational environment, at least one functional flow of the one or more computation closures, one or more cost functions, one or more rules, or a combination thereof.

13. An apparatus of claim 12, wherein the one or more capabilities include, at least in part, one or more energy consumption capabilities, one or more security enforcement capabilities, one or more privacy enforcement capabilities, one or more available resources, or a combination thereof.

14. An apparatus of claim 10, wherein the apparatus is further caused to:
cause, at least in part, a pre-creation of the at least one of the one or more computation closures.

15. An apparatus of claim 10, wherein the apparatus is further caused to:
determine one or more other privacy policies associated with the at least one other level of the computational environment,
wherein the enforcement comprises enforcing a combination of the one or more privacy policies and the one or more other privacy policies.

16. An apparatus of claim 10, wherein the apparatus is further caused to:
process and/or facilitate a processing of the one or more privacy policies, the one or more computation closures, or a combination thereof to determine one or more mechanisms for the enforcement of the one or more privacy policies.

17. An apparatus of claim 16, wherein the one or more mechanisms include, at least in part, one or more encryption mechanisms, one or more filtering mechanisms, one or more anonymization mechanisms, or a combination thereof.

18. An apparatus of claim 16, wherein the apparatus is further caused to:
determine the one or more mechanisms based, at least in part, on the at least one level of the computational environment.

* * * * *